US011845130B2

(12) United States Patent
Kenworthy et al.

(10) Patent No.: US 11,845,130 B2
(45) Date of Patent: Dec. 19, 2023

(54) ROTATIONAL ADDITIVE MANUFACTURING SYSTEMS AND METHODS

(71) Applicant: Divergent Technologies, Inc., Los Angeles, CA (US)

(72) Inventors: Michael Thomas Kenworthy, Rancho Palos Verdes, CA (US); Samuel Noah Miller, Marina Del Rey, CA (US); Krzysztof Artysiewicz, Los Angeles, CA (US); Chor Yen Yap, Gardena, CA (US); Gregory S. Weaver, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/690,959

(22) Filed: Mar. 9, 2022

(65) Prior Publication Data
US 2022/0288693 A1 Sep. 15, 2022

Related U.S. Application Data

(60) Provisional application No. 63/158,765, filed on Mar. 9, 2021.

(51) Int. Cl.
*B22F 12/37* (2021.01)
*B22F 10/28* (2021.01)
(Continued)

(52) U.S. Cl.
CPC .............. *B22F 12/37* (2021.01); *B22F 10/28* (2021.01); *B22F 10/322* (2021.01); *B22F 10/34* (2021.01);
(Continued)

(58) Field of Classification Search
CPC ... B29C 64/364; B29C 64/371; B29C 64/241; B29C 64/153; B29C 64/268;
(Continued)

(56) References Cited

U.S. PATENT DOCUMENTS 5,203,226 A 4/1993 Hongou et al.
5,742,385 A 4/1998 Champa
(Continued)

FOREIGN PATENT DOCUMENTS

WO 1996036455 A1 11/1996
WO 1996036525 A1 11/1996
(Continued)

OTHER PUBLICATIONS

US 9,202,136 B2, 12/2015, Schmidt et al. (withdrawn)
(Continued)

*Primary Examiner* — Mary Lynn F Theisen
(74) *Attorney, Agent, or Firm* — ARENTFOX SCHIFF LLP

(57) ABSTRACT

Systems and methods for rotational additive manufacturing are disclosed. An apparatus in accordance with an aspect of the present disclosure comprises a build floor, a depositor system configured to deposit a layer of powder onto the build floor, a motor system causing a rotational motion between the depositor system and the build floor, wherein the depositor system deposits the layer of powder during the rotational motion, a receptacle wall configured to contain the powder on the build floor, an energy beam source configured to apply an energy beam in an active area of the layer of powder to selectively fuse a portion of the powder in the active area to form a portion of a build piece and a gas flow system configured to provide a gas flow across the active area while the energy beam selectively fuses the portion of the layer of powder in the active area.

148 Claims, 17 Drawing Sheets

(51) Int. Cl.

| | | |
|---|---|---|
| B22F 12/45 | (2021.01) | |
| B29C 64/153 | (2017.01) | |
| B33Y 10/00 | (2015.01) | |
| B33Y 30/00 | (2015.01) | |
| B29C 64/329 | (2017.01) | |
| B29C 64/295 | (2017.01) | |
| B29C 64/241 | (2017.01) | |
| B29C 64/268 | (2017.01) | |
| B29C 64/371 | (2017.01) | |
| B22F 12/53 | (2021.01) | |
| B22F 10/322 | (2021.01) | |
| B22F 12/13 | (2021.01) | |
| B22F 12/70 | (2021.01) | |
| B33Y 50/02 | (2015.01) | |
| B29C 64/277 | (2017.01) | |
| B29C 64/245 | (2017.01) | |
| B29C 64/393 | (2017.01) | |
| B33Y 40/10 | (2020.01) | |
| B22F 10/34 | (2021.01) | |

(52) U.S. Cl.
CPC .............. *B22F 12/13* (2021.01); *B22F 12/45* (2021.01); *B22F 12/53* (2021.01); *B22F 12/70* (2021.01); *B29C 64/153* (2017.08); *B29C 64/241* (2017.08); *B29C 64/245* (2017.08); *B29C 64/268* (2017.08); *B29C 64/277* (2017.08); *B29C 64/295* (2017.08); *B29C 64/329* (2017.08); *B29C 64/371* (2017.08); *B29C 64/393* (2017.08); *B33Y 10/00* (2014.12); *B33Y 30/00* (2014.12); *B33Y 40/10* (2020.01); *B33Y 50/02* (2014.12)

(58) Field of Classification Search
CPC ...... B29C 64/277; B22F 12/70; B22F 12/226; B22F 12/37; B22F 10/28; B22F 10/322
See application file for complete search history.

(56) References Cited

U.S. PATENT DOCUMENTS

| | | | |
|---|---|---|---|
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,021,138 | B2 | 9/2011 | Green |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |

(56) References Cited

U.S. PATENT DOCUMENTS

| | | |
|---|---|---|
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |

(56) References Cited

U.S. PATENT DOCUMENTS

| | | |
|---|---|---|
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,786,865 B2 | 9/2020 | Hellestam |
| 2006/0108712 A1* | 5/2006 | Mattes .................. B22F 12/37 |
| | | 425/375 |
| 2006/0108783 A1 | 5/2006 | Ni et al. |
| 2014/0277669 A1 | 9/2014 | Nardi et al. |
| 2017/0113344 A1 | 4/2017 | Schönberg |
| 2017/0341309 A1 | 11/2017 | Piepenbrock et al. |
| 2018/0044786 A1 | 2/2018 | Bly |
| 2018/0244034 A1 | 8/2018 | Sutcliffe et al. |
| 2018/0354035 A1 | 12/2018 | Sun et al. |
| 2019/0184635 A1 | 6/2019 | Garrett et al. |
| 2020/0108559 A1* | 4/2020 | Tucker .................. B29C 64/268 |
| 2020/0122389 A1* | 4/2020 | Binek .................... B29C 64/241 |
| 2020/0156290 A1 | 5/2020 | Corsmeier |
| 2020/0254566 A1* | 8/2020 | Mamrak ............... B23K 15/002 |
| 2020/0307078 A1 | 10/2020 | Kajita et al. |
| 2020/0346407 A1 | 11/2020 | Goodwin et al. |
| 2020/0391289 A1 | 12/2020 | Weaver et al. |
| 2021/0053289 A1 | 2/2021 | Fischer et al. |
| 2021/0394270 A1* | 12/2021 | Zhang ..................... B22F 12/70 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion in PCT/US2022/019642, dated Jul. 26, 2022, 24 pages.

\* cited by examiner

ROTATIONAL ADDITIVE MANUFACTURING SYSTEMS AND METHODS

CROSS REFERENCE TO RELATED APPLICATION(S)

This application claims the benefit of U.S. Provisional Application Ser. No. 63/158,765, entitled "CONTINUOUS ROTATIONAL ADDITIVE MANUFACTURING SYSTEM ARCHITECTURE" and filed on Mar. 9, 2021, the disclosure of which is expressly incorporated by reference herein in its entirety.

BACKGROUND

Field

The present disclosure relates generally to additive manufacturing, and more specifically to a rotational additive manufacturing systems and methods.

Description of the Related Art

Three-dimensional (3-D) printing, also referred to as additive manufacturing (AM), has recently presented new opportunities to more efficiently build complex transport structures, such as automobiles, aircraft, boats, motorcycles, busses, trains, and the like. AM techniques are capable of fabricating complex components from a wide variety of materials. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print components that are much more complex and that are equipped with more advanced features and capabilities than components made via traditional machining and casting techniques. The 3-D objects may be formed using layers of material based on a digital model data of the object. A 3-D printer may form the structure defined by the digital model data by printing the structure one layer at a time.

A 3-D printer may deposit a powder layer (e.g., powdered metal) on an operating surface. The 3-D printer may then consolidate particular areas of the powder layer into a layer of the object, e.g., by using a laser to melt or sinter the powder of the powder layer together. The steps may be repeated to sequentially form each layer. Accordingly, the 3-D printed object may be built layer by layer.

3-D printing is non-design specific, which offers geometric and design flexibility that conventional manufacturing processes cannot. Furthermore, 3-D printing technologies can produce parts with small feature sizes and geometries that are either significantly difficult or impossible to produce using conventional manufacturing processes.

The AM process, however, can be time consuming. The time between printing one layer and depositing powder material for the next layer decreases the overall throughput of an AM system.

SUMMARY

Several aspects of apparatus for additive manufacturing systems and architectures will be described more fully hereinafter with reference to three-dimensional printing techniques.

An apparatus in accordance with an aspect of the present disclosure comprises a build floor, a depositor system configured to deposit a layer of powder onto the build floor, a motor system configured to cause a rotational motion between the depositor system and the build floor, wherein the depositor system deposits the layer of powder during the rotational motion, a receptacle wall configured to contain the powder on the build floor, an energy beam source configured to apply an energy beam in an active area (i.e., scan area) of the layer of powder to selectively fuse a portion of the powder in the active area to form a portion of a build piece, and a gas flow system configured to provide a gas flow across the active area while the energy beam selectively fuses the portion of the layer of powder in the active area.

Such an apparatus further optionally includes one or more of the following features: the motor system causing the rotational motion at least in part by rotating the build floor, the depositor system being configured to remain stationary during the rotational motion, the motor system causing the rotational motion at least in part by moving the depositor system in an arc over the build floor, the receptacle wall being configured to remain stationary during the rotational motion, the gas flow system extracting a gas created by the fusing of the powder, a cover configured to cover a second area of the powder exclusive of the active area, the cover including a heater configured to heat the powder under the cover, and the cover including a sensor configured to sense a characteristic of the powder under the cover.

Such an apparatus may further optionally include one or more of the following features: the gas flow system including a gas extractor arranged adjacent to a first boundary of the active area, the gas extractor being configured to extract the gas flow, the gas flow system further including a gas inlet arranged adjacent to a second boundary of the active area, the gas inlet being configured to provide the gas flow, the gas flow system including a gas extractor arranged at an axis of rotation of the rotational motion, the gas extractor being configured to extract the gas flow, the gas flow system further including a gas inlet arranged at a portion of the receptacle wall, the gas inlet being configured to provide the gas flow, and the gas inlet including a plurality of openings that collectively surround the build floor.

Such an apparatus may further optionally include one or more of the following features: the energy beam source including one or more energy beam generators, the energy beam source being configured to apply one or more energy beams in a plurality of active areas of the layer of powder to selectively fuse a portion of the powder in each of the active areas, and the gas flow system being configured to provide a gas flow across each of the active areas while the one or more energy beams selectively fuse the portion of the powder in each active area, the active areas being non-overlapping, the gas flow system including a funnel-type gas manifold, the gas flow system being further configured to rotate a direction of the gas flow, the gas flow system including a plurality of gas inlets and a plurality of gas extractors, and the gas flow system rotating the gas flow by opening and closing the gas inlets and the gas extractors, a layer thickness of the selectively fused deposited powder being varied during a build of the build piece, a speed of the rotational motion being varied based on a geometric feature density, and the depositor system including a plurality of depositors, and the depositor system being configured to deposit a plurality of layers of powder simultaneously.

An apparatus in accordance with an aspect of the present disclosure comprises a build floor, a depositor system configured to deposit a layer of powder onto the build floor, a motor system configured to cause a rotational motion between the depositor system and the build floor, wherein the depositor system deposits the layer of powder during the rotational motion, a receptacle wall configured to contain the powder on the build floor, and an energy beam source configured to apply an energy beam in an active area of the layer of powder to selectively fuse a portion of the powder in the active area to form a portion of a build piece, wherein the motor system is further configured to vary a speed of the rotational motion based on information of a build including the build piece. In various embodiments, information of the build may include a geometric feature density.

Such an apparatus further optionally includes one or more of the following features: the motor system being configured to vary the speed by increasing the speed when the geometric feature density is lower and increasing the speed when the geometric feature density is higher, the motor system causing the rotational motion at least in part by rotating the build floor, the depositor system being configured to remain stationary during the rotational motion, the motor system causing the rotational motion at least in part by moving the depositor system in an arc over the build floor, the receptacle wall being configured to remain stationary during the rotational motion, the gas flow system extracting a gas created by the fusing of the powder, a cover configured to cover a second area of the powder exclusive of the active area, the cover including a heater configured to heat the powder under the cover, and the cover including a sensor configured to sense a characteristic of the powder under the cover.

Such an apparatus may further optionally include one or more of the following features: the gas flow system including a gas extractor arranged adjacent to a first boundary of the active area, the gas extractor being configured to extract the gas flow, the gas flow system further including a gas inlet arranged adjacent to a second boundary of the active area, the gas inlet being configured to provide the gas flow, the gas flow system including a gas extractor arranged at an axis of rotation of the rotational motion, the gas extractor being configured to extract the gas flow, the gas flow system further including a gas inlet arranged at a portion of the receptacle wall, the gas inlet being configured to provide the gas flow, and the gas inlet including a plurality of openings that collectively surround the build floor.

Such an apparatus may further optionally include one or more of the following features: the energy beam source including one or more energy beam generators, the energy beam source being configured to apply one or more energy beams in a plurality of active areas of the layer of powder to selectively fuse a portion of the powder in each of the active areas, and the gas flow system being configured to provide a gas flow across each of the active areas while the one or more energy beams selectively fuse the portion of the powder in each active area, the active areas being non-overlapping, the gas flow system including a funnel-type gas manifold, the gas flow system being further configured to rotate a direction of the gas flow, the gas flow system including a plurality of gas inlets and a plurality of gas extractors, and the gas flow system rotating the gas flow by opening and closing the gas inlets and the gas extractors, a layer thickness of the selectively fused deposited powder being varied during a build of the build piece, a speed of the rotational motion being varied based on a geometric feature density, and the depositor system including a plurality of depositors, and the depositor system being configured to deposit a plurality of layers of powder simultaneously.

An apparatus in accordance with an aspect of the present disclosure comprises a build floor, a depositor system configured to deposit a powder onto the build floor, a motor system configured to cause a rotational motion between the depositor system and the build floor, wherein the depositor system deposits the layer of powder during the rotational motion, a receptacle wall configured to contain the powder on the build floor, and an energy beam source configured to apply an energy beam in an active area of the layer of powder to selectively fuse a portion of the powder in the active area to form a portion of a build piece, wherein a layer thickness of the selectively fused deposited powder is varied during a build of the build piece.

Such an apparatus further optionally includes one or more of the following features: the depositor system includes a plurality of depositors, the active area includes a plurality of active areas, each arranged after a different depositor of the plurality of depositors, a first depositor in the plurality of depositors is arranged 180 degrees apart from a second depositor with respect to the rotational motion, wherein the first depositor is associated with a first active area of the plurality of active areas arranged after the first depositor, and the second depositor is associated with a second active area of the plurality of active areas arranged after the second depositor, the layer thickness of the selectively fused deposited powder is varied by the energy beam source fusing some portions of the powder layer in both the first and second active areas and fusing other portions of the powder layer in only the first or second active area, the energy beam source is configured to fuse a portion of the build piece near the edge of the build piece by fusing in both the first and second active areas, and is configured to fuse a portion of the build piece in the interior bulk of the build piece in only the first or second active area, the energy beam source is further configured to apply a plurality of energy beams simultaneously in the plurality of active areas.

Such an apparatus further optionally includes one or more of the following features: the depositor system including a plurality of depositors, the energy beam source including a plurality of energy beams and the active area including a plurality of active areas, a first depositor in the plurality of depositors depositing a first thickness of powder and a second depositor in the plurality of depositors depositing a second thickness of powder. a first energy beam in the plurality of energy beams fusing the first thickness of powder in a first active area in the plurality of active areas, a second energy beam in the plurality of energy beams fusing the second thickness of powder in a second active area in the plurality of active areas, and a first energy beam in the plurality of energy beams fusing the first thickness of powder and the second thickness of powder in a first active area in the plurality of active areas.

Such an apparatus further optionally includes one or more of the following features: the motor system causing the rotational motion at least in part by rotating the build floor, the depositor system being configured to remain stationary during the rotational motion, the motor system causing the rotational motion at least in part by moving the depositor system in an arc over the build floor, the receptacle wall being configured to remain stationary during the rotational motion, the gas flow system extracting a gas created by the fusing of the powder, a cover configured to cover a second area of the powder exclusive of the active area, the cover including a heater configured to heat the powder under the cover, and the cover including a sensor configured to sense a characteristic of the powder under the cover.

Such an apparatus may further optionally include one or more of the following features: the gas flow system including a gas extractor arranged adjacent to a first boundary of the active area, the gas extractor being configured to extract the gas flow, the gas flow system further including a gas inlet arranged adjacent to a second boundary of the active area, the gas inlet being configured to provide the gas flow, the gas flow system including a gas extractor arranged at an axis of rotation of the rotational motion, the gas extractor being configured to extract the gas flow, the gas flow system further including a gas inlet arranged at a portion of the receptacle wall, the gas inlet being configured to provide the gas flow, and the gas inlet including a plurality of openings that collectively surround the build floor.

Such an apparatus may further optionally include one or more of the following features: the energy beam source including one or more energy beam generators, the energy beam source being configured to apply one or more energy beams in a plurality of active areas of the layer of powder to selectively fuse a portion of the powder in each of the active areas, and the gas flow system being configured to provide a gas flow across each of the active areas while the one or more energy beams selectively fuse the portion of the powder in each active area, the active areas being non-overlapping, the gas flow system including a funnel-type gas manifold, the gas flow system being further configured to rotate a direction of the gas flow, the gas flow system including a plurality of gas inlets and a plurality of gas extractors, and the gas flow system rotating the gas flow by opening and closing the gas inlets and the gas extractors, a layer thickness of the selectively fused deposited powder being varied during a build of the build piece, a speed of the rotational motion being varied based on a geometric feature density.

A method in accordance with an aspect of the present disclosure comprises controlling a depositor system to deposit a layer of powder onto a build floor, controlling a motor system to cause a rotational motion between the depositor system and the build floor, wherein the depositor system deposits the layer of powder during the rotational motion, and a receptacle wall contains the powder on the build floor, controlling an energy beam source to apply an energy beam in an active area of the layer of powder to selectively fuse a portion of the powder in the active area to form a portion of a build piece, and controlling a gas flow system to provide a gas flow across the active area while the energy beam selectively fuses the portion of the layer of powder in the active area.

Such a method may further optionally include one or more of the following features: controlling the motor system causes the rotational motion at least in part by rotating the build floor, the depositor system is configured to remain stationary during the rotational motion, controlling the motor system causes the rotational motion at least in part by moving the depositor system in an arc over the build floor, the receptacle wall is configured to remain stationary during the rotational motion, controlling the gas flow system extracts a gas created by the fusing of the powder, covering a second area of the powder exclusive of the active area with a cover, controlling a heater configured to heat the powder under the cover, wherein the heater is arranged in the cover, controlling a sensor to sense a characteristic of the powder under the cover, wherein the sensor is arranged in the cover, controlling the gas flow system includes controlling a gas extractor arranged adjacent to a first boundary of the active area, the gas extractor being controlled to extract the gas flow, controlling the gas flow system further includes controlling a gas inlet arranged adjacent to a second boundary of the active area, the gas inlet being controlled to provide the gas flow, controlling the gas flow system includes controlling a gas extractor arranged at an axis of rotation of the rotational motion, the gas extractor being controlled to extract the gas flow, controlling the gas flow system further includes controlling a gas inlet arranged at a portion of the receptacle wall, the gas inlet being controlled to provide the gas flow, the gas inlet includes a plurality of openings that collectively surround the build floor, the energy beam source includes one or more energy beam generators, controlling the energy beam source includes applying one or more energy beams in a plurality of active areas of the layer of powder to selectively fuse a portion of the powder in each of the active areas, and controlling the gas flow system includes providing a gas flow across each of the active areas while the one or more energy beams selectively fuse the portion of the powder in each active area, the active areas are non-overlapping, the gas flow system includes a funnel-type gas manifold, controlling the gas flow system includes rotating a direction of the gas flow, the gas flow system includes a plurality of gas inlets and a plurality of gas extractors, and controlling the gas flow system includes rotating the gas flow by opening and closing the gas inlets and the gas extractors, varying a layer thickness of the selectively fused deposited powder during a build of the build piece, obtaining information of a geometric feature density, wherein controlling the motor system includes varying a speed of the rotational motion based on the geometric feature density, the depositor system includes a plurality of depositors, and controlling the depositor system includes depositing a plurality of layers of powder simultaneously.

A method in accordance with an aspect of the present disclosure comprises obtaining information of a build including a build piece, controlling a depositor system to deposit a layer of powder onto a build floor, controlling a motor system to cause a rotational motion between the depositor system and the build floor, wherein the depositor system deposits the layer of powder during the rotational motion, and a receptacle wall contains the powder on the build floor, wherein controlling the motor system further includes varying a speed of the rotational motion based on the information of the build during the build of the build piece, and controlling an energy beam source to apply an energy beam in an active area of the layer of powder to selectively fuse a portion of the powder in the active area to form a portion of the build piece.

Such a method may further optionally include one or more of the following features: the information of the build includes a geometric feature density, and controlling the motor system includes varying the speed based on the geometric feature density, controlling the motor system causes the rotational motion at least in part by rotating the build floor, the depositor system is configured to remain stationary during the rotational motion, controlling the motor system causes the rotational motion at least in part by moving the depositor system in an arc over the build floor, the receptacle wall is configured to remain stationary during the rotational motion, controlling a gas flow system to extract a gas created by the fusing of the powder, covering a second area of the powder exclusive of the active area with a cover, controlling a heater to heat the powder under the cover, wherein the heater is arranged in the cover, controlling a sensor to sense a characteristic of the powder under the cover, wherein the sensor is arranged in the cover, controlling a gas flow system including a gas extractor arranged adjacent to a first boundary of the active area, the gas extractor being controlled to extract a gas flow, the gas flow system further includes a gas inlet arranged adjacent to a second boundary of the active area, controlling the gas flow system further includes controlling the gas inlet to provide the gas flow, controlling a gas flow system including a gas extractor arranged at an axis of rotation of the rotational motion, wherein the gas extractor is controlled to extract a gas flow, the gas flow system further includes a gas inlet arranged at a portion of the receptacle wall, controlling the gas flow system further includes controlling the gas inlet to provide the gas flow, the gas inlet includes a plurality of openings that collectively surround the build floor, the energy beam source includes one or more energy beam generators, controlling the energy beam source includes applying one or more energy beams in a plurality of active areas of the layer of powder to selectively fuse a portion of the powder in each of the active areas, the method further comprising controlling a gas flow system to provide a gas flow across each of the active areas while the one or more energy beams selectively fuse the portion of the powder in each active area, the active areas are non-overlapping, the gas flow system includes a funnel-type gas manifold, controlling a gas flow system to rotate a direction of the gas flow across the active area, controlling the gas flow system includes controlling a plurality of gas inlets and a plurality of gas extractors such that the gas flow system rotates the gas flow by opening and closing the gas inlets and the gas extractors, varying a layer thickness of the selectively fused deposited powder during a build of the build piece, the information of the build includes a geometric feature density, and varying the speed of the rotational motion includes increasing the speed when the geometric feature density is low and decreasing the speed when the geometric feature density is high, the depositor system includes a plurality of depositors, and controlling the depositor system includes depositing a plurality of layers of powder simultaneously.

A method in accordance with an aspect of the present disclosure comprises controlling a depositor system to deposit a layer of powder onto a build floor, controlling a motor system to cause a rotational motion between the depositor system and the build floor, wherein the depositor system deposits the layer of powder during the rotational motion, and a receptacle wall contains the powder on the build floor, controlling an energy beam source to apply an energy beam in an active area of the layer of powder to selectively fuse a portion of the powder in the active area to form a portion of a build piece, and varying a layer thickness of the selectively fused deposited powder during a build of the build piece.

Such a method may further optionally include one or more of the following features: the depositor system includes a plurality of depositors, wherein controlling the depositor system includes controlling the plurality of depositors to deposit layers of powder simultaneously, the active area includes a plurality of active areas, each arranged after a different depositor of the plurality of depositors, a first depositor in the plurality of depositors is arranged 180 degrees apart from a second depositor with respect to the rotational motion, wherein the first depositor is associated with a first active area of the plurality of active areas arranged after the first depositor, and the second depositor is associated with a second active area of the plurality of active areas arranged after the second depositor, varying the layer thickness of the selectively fused deposited powder includes controlling the energy beam source to fuse some portions of the powder layer in both the first and second active areas and to fuse other portions of the powder layer in only the first or second active area, controlling the energy beam source includes fusing a portion of the build piece near the edge of the build piece by fusing in both the first and second active areas, and fusing a portion of the build piece in the interior bulk of the build piece in only the first or second active area, controlling the energy beam source further includes applying a plurality of energy beams simultaneously in the plurality of active areas, controlling the motor system causes the rotational motion at least in part by rotating the build floor, the depositor system is configured to remain stationary during the rotational motion, controlling the motor system causes the rotational motion at least in part by moving the depositor system in an arc over the build floor, the receptacle wall is configured to remain stationary during the rotational motion, controlling a gas flow system to provide a gas flow across the active area, the gas flow system extracts a gas created by the fusing of the powder, covering a second area of the powder exclusive of the active area with a cover, controlling a heater to heat the powder under the cover, wherein the heater is arranged in the cover, controlling a sensor to sense a characteristic of the powder under the cover, wherein the sensor is arranged in the cover, controlling a gas flow system including a gas extractor arranged adjacent to a first boundary of the active area, such that gas extractor extracts a gas flow, the gas flow system further includes a gas inlet arranged adjacent to a second boundary of the active area, the gas inlet being configured to provide the gas flow, controlling a gas flow system including a gas extractor arranged at an axis of rotation of the rotational motion, such that the gas extractor extracts a gas flow, the gas flow system further includes a gas inlet arranged at a portion of the receptacle wall, the gas inlet being configured to provide the gas flow, the gas inlet includes a plurality of openings that collectively surround the build floor, the energy beam source includes one or more energy beam generators, and controlling the energy beam source includes applying one or more energy beams in a plurality of active areas of the layer of powder to selectively fuse a portion of the powder in each of the active areas, and controlling a gas flow system to provide a gas flow across each of the active areas while the one or more energy beams selectively fuse the portion of the powder in each active area, the active areas are non-overlapping, controlling a gas flow system including a funnel-type gas manifold to provide a gas flow across the active area, controlling a gas flow system to rotate a direction of a gas flow across the active area, the gas flow system includes a plurality of gas inlets and a plurality of gas extractors, and controlling the gas flow system includes rotating the gas flow by opening and closing the gas inlets and the gas extractors, varying a speed of the rotational motion based on a geometric feature density.

It will be understood that other aspects of apparatuses for additive manufacturing systems will become readily apparent to those skilled in the art from the following detailed description, wherein it is shown and described only several embodiments by way of illustration. As will be realized by those skilled in the art, the apparatus for bridging is capable of other and different embodiments, and its several details are capable of modification in various other respects, all without departing from the scope of the present disclosure. Accordingly, the drawings and detailed description are to be regarded as illustrative in nature and not as restrictive.

BRIEF DESCRIPTION OF THE DRAWINGS

Various aspects of apparatus for additive manufacturing systems and methods will now be presented in the detailed description by way of example, and not by way of limitation, in the accompanying drawings, wherein.

DETAILED DESCRIPTION

Figure 1A:
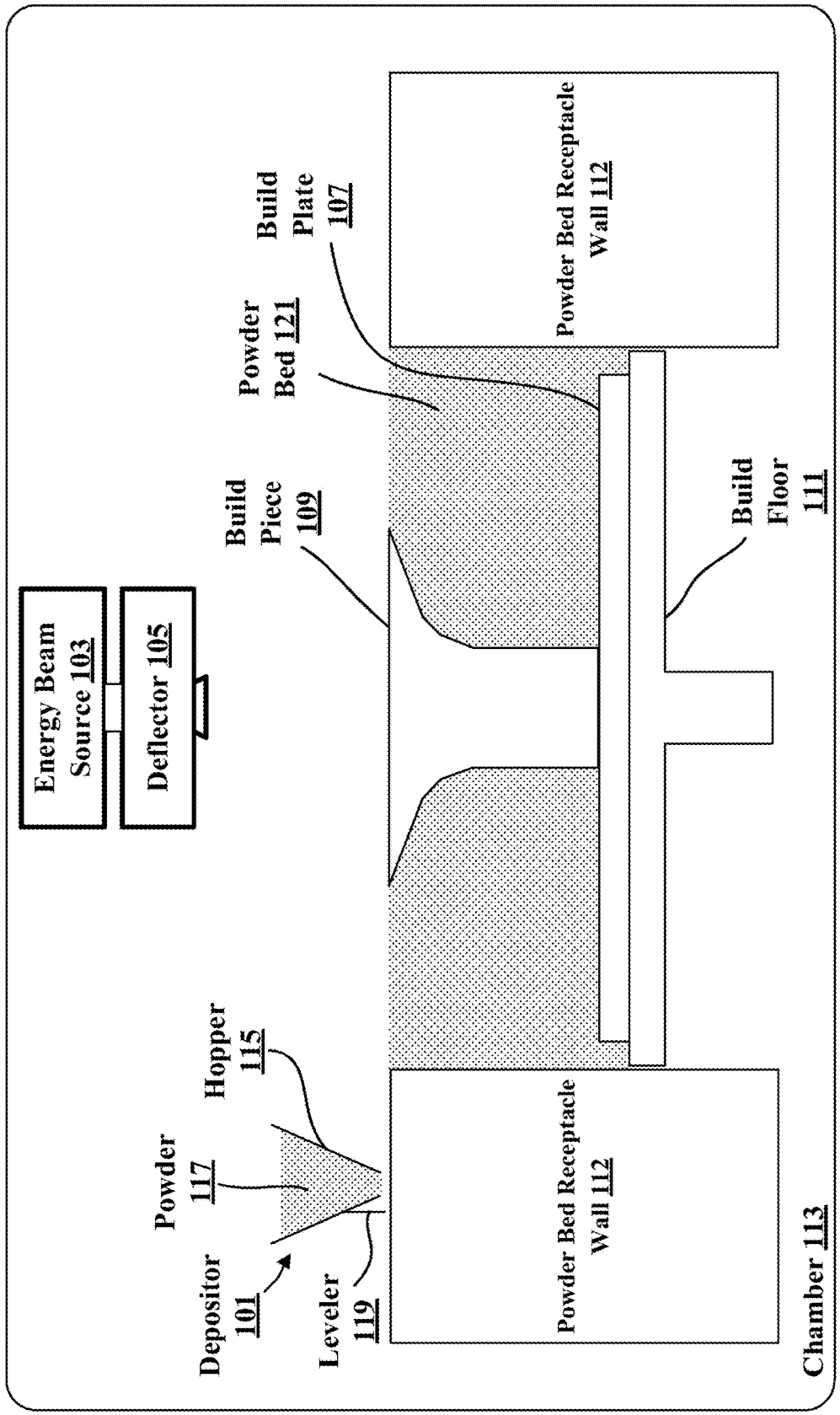
FIGS. 1A-1D illustrate respective side views of an exemplary conventional PBF system during different stages of operation.

The detailed description set forth below in connection with the drawings is intended to provide a description of exemplary embodiments of apparatuses for additive manufacturing systems and methods, and it is not intended to represent the only embodiments in which the disclosure may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the disclosure to those skilled in the art. However, the disclosure may be practiced without these specific details. In some instances, well-known structures and components may be shown in block diagram form, or omitted entirely, in order to avoid obscuring the various concepts presented throughout this disclosure.

Additive Manufacturing

Additive Manufacturing (AM) involves the use of a stored geometrical model for accumulating layered materials on a build plate to produce a three-dimensional (3-D) build piece having features defined by the model. AM techniques are capable of printing complex components using a wide variety of materials. A 3-D object may be fabricated based on a computer aided design (CAD) model. The CAD model can be used to generate a set of instructions or commands that are compatible with a particular 3-D printer. The AM process can create a solid three-dimensional object using the CAD model and print instructions. In the AM process, different materials or combinations of material, such as engineered plastics, thermoplastic elastomers, metals, ceramics, and/or alloys or combinations of the above, etc., may be used to create a uniquely shaped 3-dimensional object.

A number of different AM technologies may be well-suited for rotational AM. Such 3-D printing techniques may include, for example, selective laser melting (SLM), selective laser sintering (SLS), direct metal laser sintering (DMLS), electron beam melting (EBM), powder bed fusion (PBF), and/or other AM processes involving melting or fusion of metallic powders.

As in many 3-D printing techniques, these processes (e.g., PBF systems) can create build pieces layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

AM may include the manufacture of one or more nodes. A node is a structural member that may include one or more interfaces used to connect to other nodes or spanning components such as tubes, extrusions, panels, and the like. Using AM, a node may be constructed to include additional features and functions, including interface functions, depending on the objectives.

Nodes and other components may be connected together. For example, one or more nodes and/or other components may be connected together to form larger components. Accordingly, individual AM structures often need to be connected together, or individual AM structures often need to be connected to machined or COTS parts, to provide combined structures, e.g., to realize the above modular network or to form a complex interior assembly in a vehicle. Examples include node-to-node connections, node-to-panel connections, node-to-tube connections, and node-extrusion connections, among others. To connect an AM joint member with a vehicle body panel, for example, mechanical connectors (e.g., screws, clamps, etc.) may be used. Alternatively or additionally, an adhesive may be used to form a strong bond. For connecting these parts, a strict tolerance is often desired, meaning that the parts must be positioned to fit precisely in an established orientation. For example, the two parts to be adhered may need to be positioned to avoid direct contact with each other in order to mitigate possible galvanic corrosion problems. In general, an adhesive connection between the AM joint member and panel should result in an accurate fit. Thus the AM joint member should not be misaligned with or offset from the body panel, for example, and the parts should remain properly oriented when a permanent bond is established.

Additive Manufacturing Environment

FIGS. 1A-1D illustrate respective side views of a conventional 3-D printer system.

In an aspect of the present disclosure, a 3-D printer system may be a powder-bed fusion (PBF) system 100. FIGS. 1A-D show a conventional PBF system 100 during different stages of operation. The particular embodiment in FIGS. 1A-1D illustrates various principles of PBF systems that may be helpful in understanding principles of this disclosure. Various components described in the present embodiment are also used in the embodiments of rotational AM, but may not be included in figures below for the sake of clarity and to avoid obscuring other details. For example, components such as energy beam sources (e.g., laser source(s) and optical deflector(s), electron beam source(s) and magnetic deflector(s)) are not shown expressly in some of the figures below because some of the figures are top views in which the energy beam source would obscure other portions of the embodiments. However, one skilled in the art will readily understand how such components are implemented in the embodiment of FIGS. 1A-D and can be implemented in the embodiments described below and in other embodiments according to aspects of the disclosure. It should also be noted that elements of FIGS. 1A-1D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 200 individual layers, to form the current state of build piece 109, e.g., formed of 200 individual slices. The multiple individual layers already deposited have created a powder bed 121, which includes powder that was deposited but not fused.

Figure 1B:
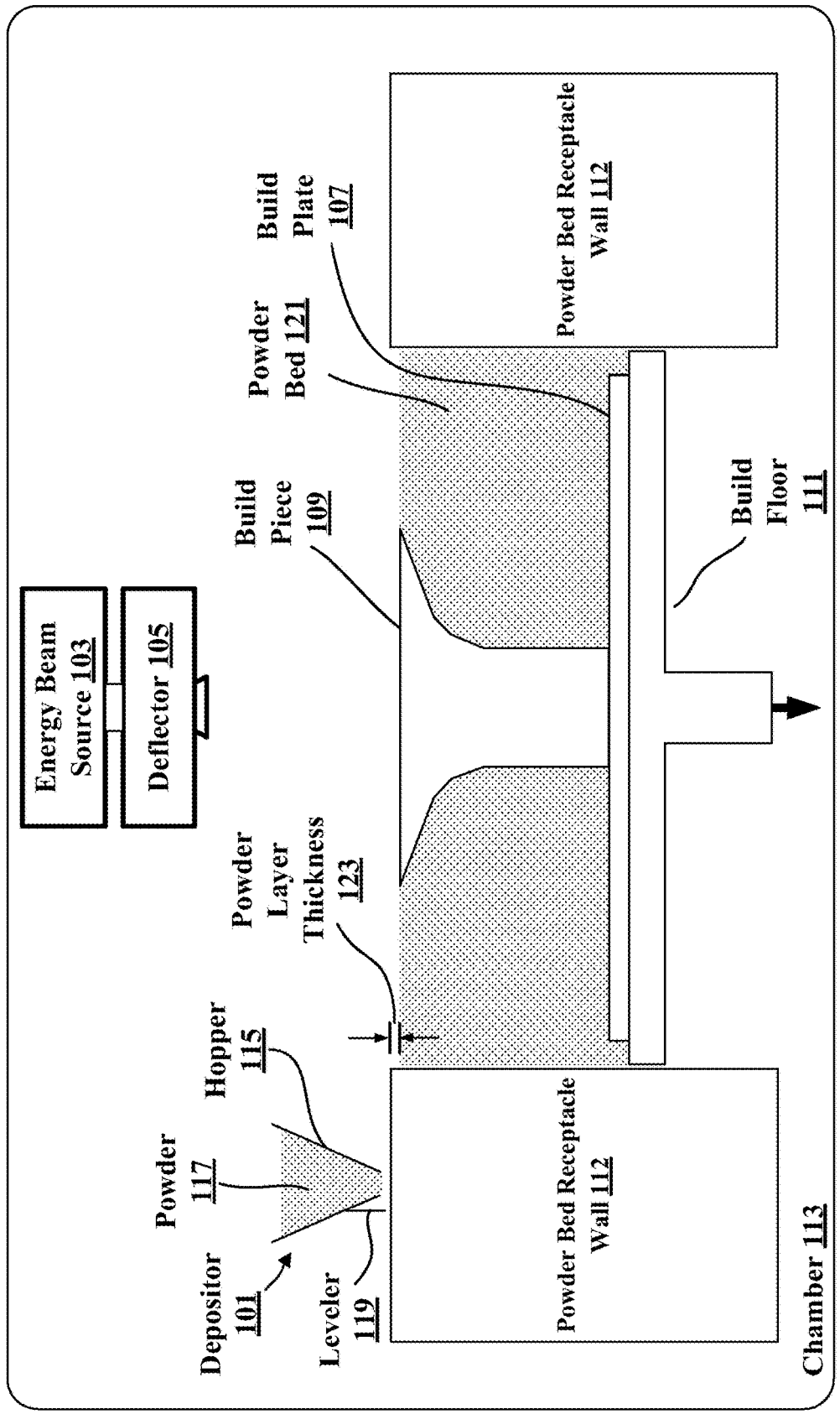

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of build piece 109 and powder bed 121 are lower than the top of powder bed receptacle wall 112 by an amount equal to the powder layer thickness 123. In this way, for example, a space with a consistent thickness equal to powder layer thickness 123 can be created over the tops of build piece 109 and powder bed 121. In this example, build floor 111 is lowered, but not rotated.

Figure 1C:
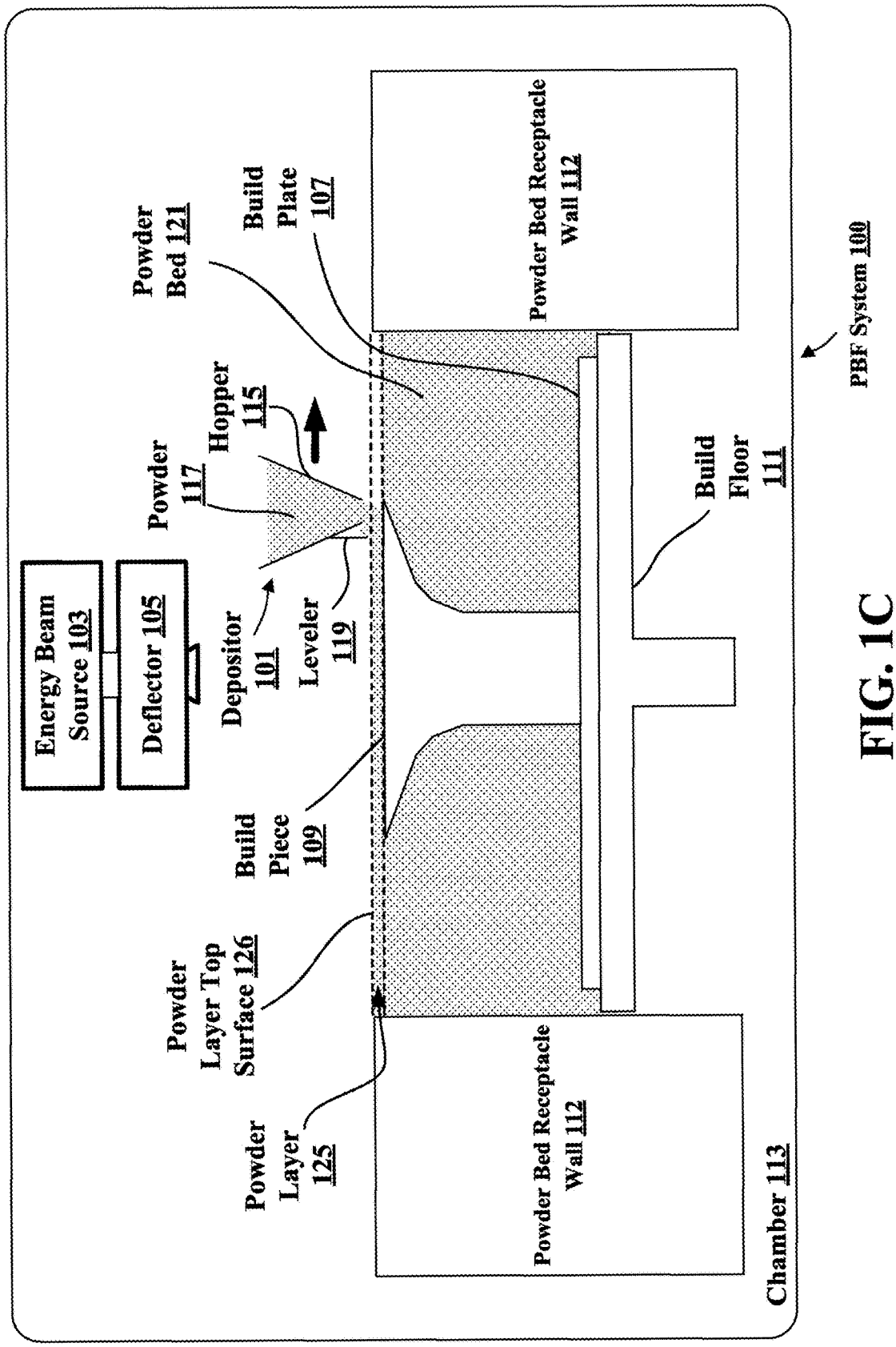

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space (linearly from left to right as viewed in FIG. 1C) while releasing powder 117 from hopper 115. Leveler 119 can level the released powder to form a powder layer 125 that leaves powder layer top surface 126 configured to receive fusing energy from energy beam source 103. Powder layer 125 has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving the 200 previously-deposited individual layers discussed above with reference to FIG. 1A. It should be noted that fusing of the powder is not occurring while depositor 101 is depositing powder.

Figure 1D:
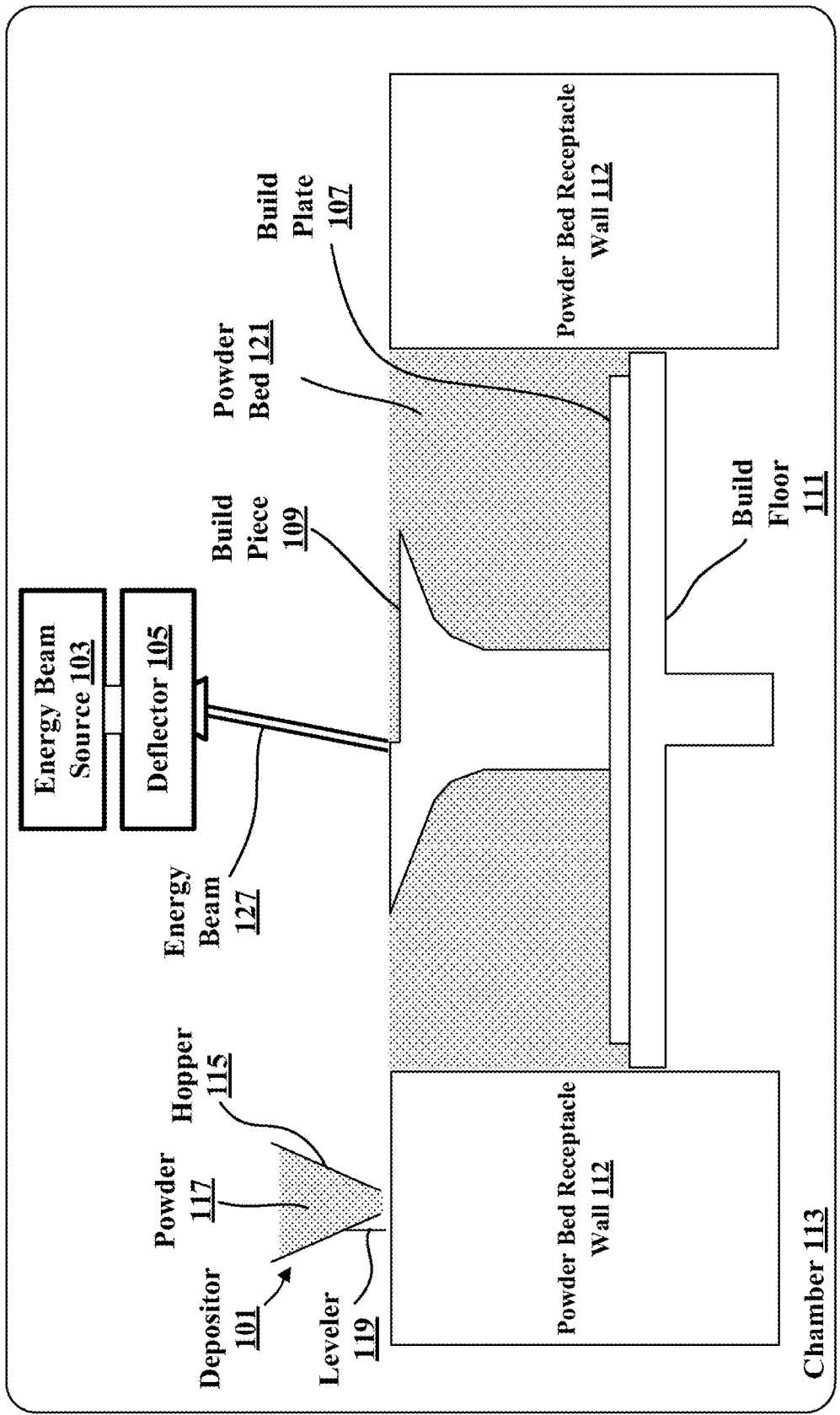

FIG. 1D shows PBF system 100 at a stage in which, following the deposition of powder layer 125 (FIG. 1C), depositor 101 has returned to its starting position and is no longer depositing powder, and energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
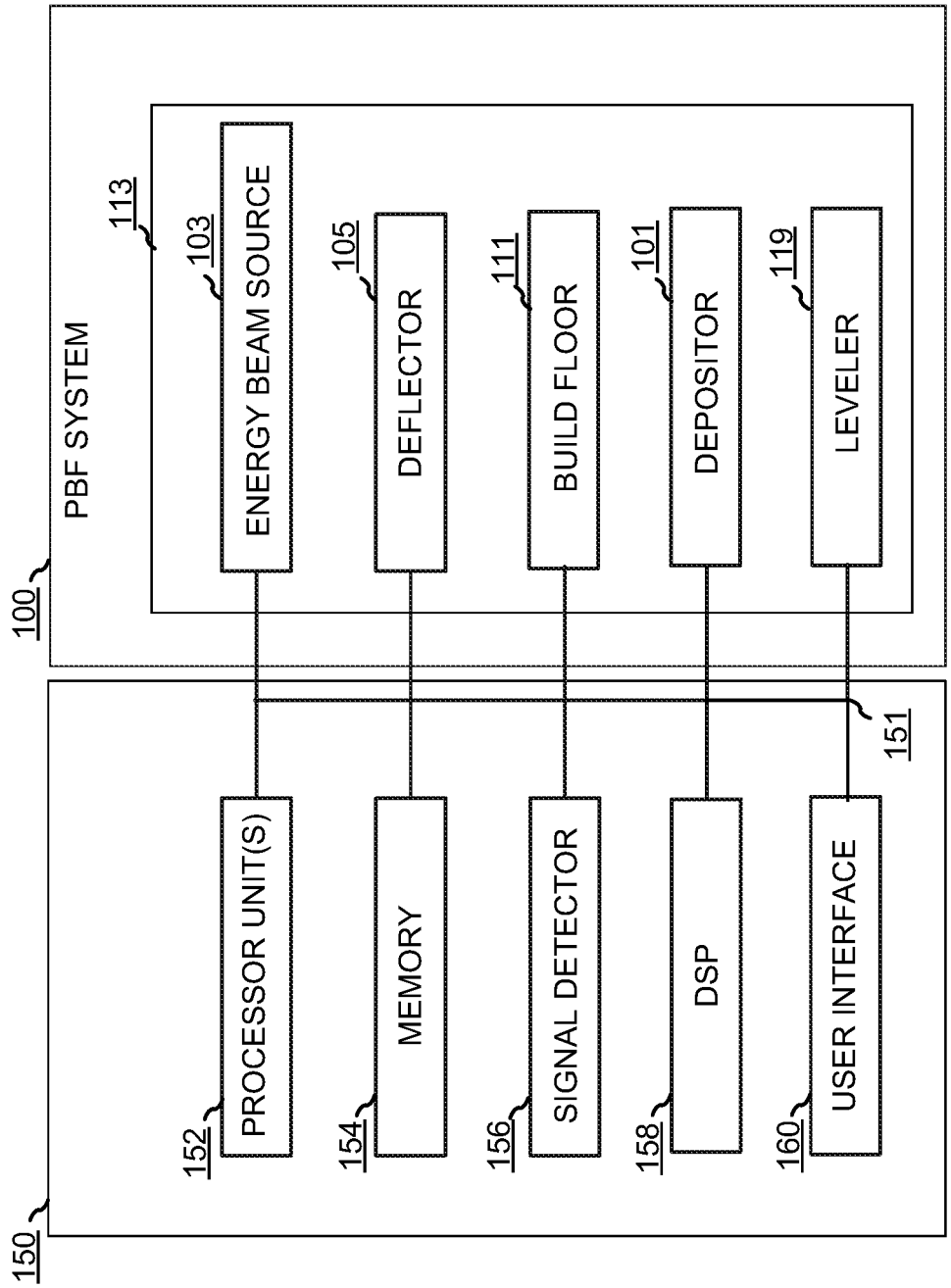
FIG. 1E illustrates a functional block diagram of a 3-D printer system.

FIG. 1E illustrates a functional block diagram of a 3-D printer system.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems.

In an aspect of the present disclosure, computer 150 may comprise at least one processor unit 152, memory 154, signal detector 156, a digital signal processor (DSP) 158, and one or more user interfaces 160. Computer 150 may include additional components without departing from the scope of the present disclosure.

The computer 150 may include at least one processor unit 152, which may assist in the control and/or operation of PBF system 100. The processor unit 152 may also be referred to as a central processing unit (CPU). Memory 154, which may include both read-only memory (ROM) and random access memory (RAM), may provide instructions and/or data to the processor unit 152. A portion of the memory 154 may also include non-volatile random access memory (NVRAM). The processor 152 typically performs logical and arithmetic operations based on program instructions stored within the memory 154. The instructions in the memory 154 may be executable (by the processor unit 152, for example) to implement the methods described herein.

The processor unit 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 150 may also include a signal detector 156 that may be used to detect and quantify any level of signals received by the computer 150 for use by the processing unit 152 and/or other components of the computer 150. The signal detector 156 may detect such signals as energy beam source 103 power, deflector 105 position, build floor 111 height, amount of powder 117 remaining in depositor 101, leveler 119 position, and other signals. Signal detector 156, in addition to or instead of processor unit 152 may also control other components as described with respect to the present disclosure. The computer 150 may also include a DSP 158 for use in processing signals received by the computer 150. The DSP 158 may be configured to generate instructions and/or packets of instructions for transmission to PBF system 100.

The computer 150 may further comprise a user interface 160 in some aspects. The user interface 160 may comprise a keypad, a pointing device, and/or a display. The user interface 160 may include any element or component that conveys information to a user of the computer 150 and/or receives input from the user.

The various components of the computer 150 may be coupled together by an interface 151. The interface 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor unit 152 may be used to implement not only the functionality described above with respect to the processor unit 152, but also to implement the functionality described above with respect to the signal detector 156, the DSP 158, and/or the user interface 160. Further, each of the components illustrated in FIG. 1E may be implemented using a plurality of separate elements.

By way of example, an element, or any portion of an element, or any combination of elements may be implemented using one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors may execute software as that term is described above.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

It should be understood that a computer such as computer 150 and computer-readable instructions (e.g., computer programs) may similarly be implemented in the following example embodiments to control a PBF system in the various ways described below.

Figure 2:
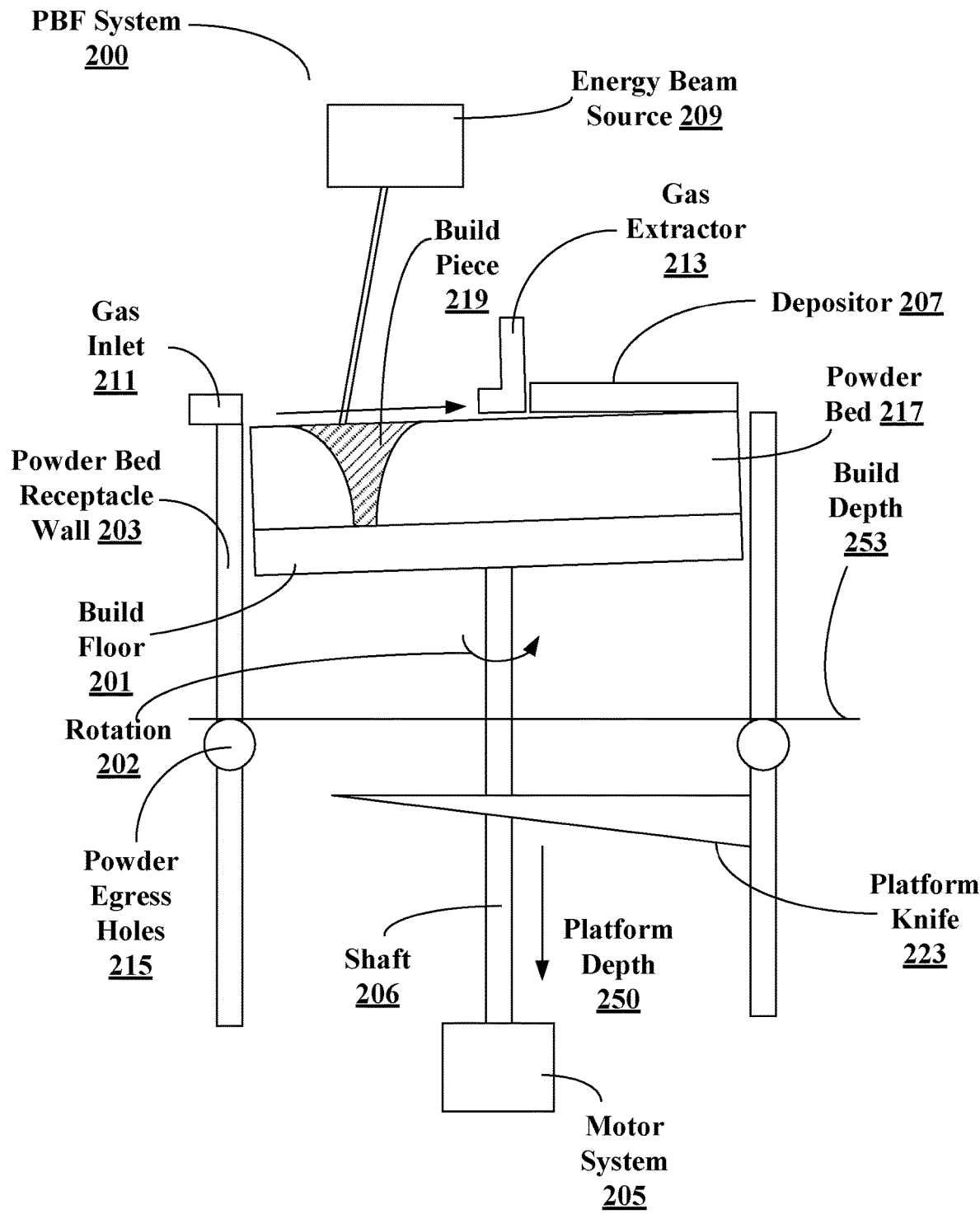
FIG. 2 illustrates a side view of a printing system in accordance with an aspect of the present disclosure.

FIG. 2 illustrates a side view of a printing system in accordance with an aspect of the present disclosure.

In an aspect of the present disclosure, a PBF system 200 (which may be referred to as an apparatus herein) may comprise, inter alia, a build floor 201 that rotates as shown by rotation 202. As build floor 201 rotates, it also moves downward, and the depth of build floor 201 with respect to the top of a powder bed receptacle wall 203 changes, as shown by platform depth 250. A motor system 205 can cause the rotational motion of build floor 201, and can also cause the downward motion of the build floor. In various embodiments, for example, motor system 205 may include a threaded screw with a thread pitch equal to a layer thickness of the powder to be deposited. In the present example, a shaft 206 connects motor system 205 with build floor 201, and the shaft may include a threaded screw. In the present example, the other portions of the apparatus (such as powder bed receptacle wall 203, a depositor 207, an energy beam source 209, a gas inlet 211, and a gas extractor 213) remain stationary with respect to the rotational motion of build floor 201. In the present example, build floor 201 moves downward toward powder egress holes 215 in powder bed receptacle wall 203 and a platform knife 223.

As build floor 201 rotates and moves downward (e.g., in a continuous, spiral motion), depositor deposits a layer of powder material (e.g., metal powder) onto the build floor to create a powder bed 217. The layer of powder material rotates into an active area of energy beam source 209, and the energy beam source applies an energy beam to fuse portions of the powder layer to form a layer of a build piece 219. As energy beam source 209 is applying the energy beam, gas inlet 211 can allow a gas to flow over the active area, and gas extractor 213 can allow the gas flow to exit the chamber. In this way, for example, smoke, soot, and other byproducts of the fusing process may be removed quickly so that the smoke, soot, etc. does not negatively affect the operation of the energy beam, e.g., by obscuring the beam from fully reaching the powder bed.

It is noted that the position of the gas inlet(s) and extractor(s) may be reversed in the example embodiments described herein, as one skilled in the art would readily recognize.

Once build floor 201 is lowered to a build depth 253, powder bed 217 is exposed to powder egress holes 215, and the powder in the powder bed can be allowed to escape through the powder egress holes, which may be holes or screens in the powder bed receptacle walls 203 to allow for some removal or exit paths for any powder from the PBF system 200. As build floor 201 is lowered further, it may come into proximity with platform knife 223. Build floor 201 may be configured to thread past platform knife 223 such that the platform knife is positioned just over the build floor. As the build floor continues to rotate, platform knife 223 can come into contact with the bottom of build piece 219, i.e., where the build piece is attached to the build floor, and the platform knife can cut or break the build piece off of the build floor as the build floor continues to rotate.

In the present example embodiment, motor system 205, coupled to build floor 201 (which may be called a build plate herein) via shaft 206, may rotate the build floor in cylindrical powder bed receptacle wall 203. Powder bed receptacle wall 203 may be configured to contain the powder on the build floor. Build floor 201 may include seals to further prevent powder from escaping, e.g., between the build floor and the powder bed receptacle wall. After the build is completed, motor system 205 may rotate and raise build floor 201 back to the starting position at the top of powder bed receptacle wall(s) 203 to begin another build. In various embodiments, motor system 205 may further rotate powder bed receptacle wall 203 together with build floor 201, such that the build floor moves vertically but not rotationally with respect to the powder bed receptacle wall. In this way, for example, wear and tear on the seal between the build floor and the powder bed receptacle wall may be reduced. It is noted that the motor system that causes the rotational motion may not be explicitly illustrated or described in some of the figures below, because the motor system may be below the build floor in a top view. However, one skilled in the art will readily understand how motor systems are implemented in all of the embodiments disclosed herein based on the descriptions of the rotational motion and which components are being rotated.

As shown in FIG. 2, an apparatus such as PBF system 200 may provide a rotational layer based processing of the build volume. In various embodiments, the depositor can continuously deposit powder, and the energy beam source can fuse portions of the build piece while the depositor is depositing powder, without having to wait until completion of a depositing step. Instead of a horizontally "sliced" geometry, i.e., a geometry with strictly horizontal layers such as is generated by the PBF system 100 shown in FIGS. 1A-1D, PBF system 200 may create a build piece having a geometry that is sliced in a spiral-wise fashion. In an aspect of the present disclosure, PBF system 200 may enable changes to the gas management that may improve the 3-D printing process.

For example, and not by way of limitation, PBF system 200 may allow for more efficient handling of soot and other gaseous by-products of powder micro-welding processes than PBF system 100 of the related art. Further, the speed of rotation 202 can be varied depending on information of the build. The build may also be referred to as the build job, print job, etc. In various embodiments, information of the build can include a geometric feature density being processed by PBF system 200, which may increase efficiency. As used herein, geometric feature density refers to the percentage of the active area that is being processed (e.g., fused) at any given time. A high geometric feature density, for example, could include the situation in which a large portion of a build piece is in the active area and therefore a large portion of the active area is to be fused. Likewise, a high geometric feature density, for example, could include the situation in which many build pieces are being printed in the same print build, and the many build pieces come into the active area, requiring a large portion of the active area to be fused. On the other hand, a low geometric feature density can refer to the opposite of these examples, i.e., the active area includes only a small portion of a single build piece or only a few of many build pieces. In an aspect of the present disclosure, the speed of rotation 202 can be increased when the geometric feature density related to build piece 219 or a print build is low and decreased when the feature density related to the build piece or the print build is high. In this way the energy beam(s), e.g., lasers, can be continuously kept working at or near full capacity.

In some PBF systems 100, the time used to print a given component is governed by pause times between layers, e.g., the time it takes to put down a new layer of powder, level the layer of powder, etc., rather than the volume of material fused and/or sintered in any specific layer. This results in a strong printing inefficiency, that is especially penalizing for materials that require long interlayer wait times, e.g., powders with high melting temperatures, low thermal conductivities, etc. In an aspect of the present disclosure, PBF system 200 may enable a more efficient thermal management strategy by decreasing the time between powder deposition and printing and/or reducing the time inefficiencies between layers.

In an aspect of the present disclosure, the rotational speed can be changed based on thermal management strategies, build densities, materials being fused, and/or other variables. This change in rotational speed can be done globally, e.g., for an entire component, or locally, e.g., for certain parts of a component build, which may increase the efficiency of the build process.

The build piece 219 volume may be further segmented in PBF system 200 to achieve various build optimization goals, such as processing under different conditions, use of different optics, etc., because of the more continuous printing process enabled by the present disclosure. Depending on the material and geometry being processed, PBF system 200 can be configured to support more efficient printing. By using a multi-sectored approach, in an aspect of the present disclosure gas extraction strategies can be tailored to the specific optics strategy for material processing occurring in a given sector. For example, parts with lots of thin areas, such as a heat exchanger or a heavily lattice-based structure, will have little use for optics that can de-focus and apply a wide beam profile; efforts may be better spent on agile optics with the necessary feature resolution. By contrast, thick-walled parts with relatively lower surface area density can be efficiently processed using zoom/de-focus strategies.

In an aspect of the present disclosure, PBF system 200 may enable additional design geometries that were previously unattainable with PBF system 100 of the related art. By reducing any non-exposure time between layers, PBF system 200 of the present disclosure may be more efficient. Further, PBF system 200 may be able to dynamically change its rotation speed for various portions of the printing process, which may also increase printing efficiency.

Since the build floor 201 is rotating (i.e., rotation 202), that the relative position between a printed feature and the optics (e.g., energy beam source 103, deflector 105, etc.) may change over time. In an aspect of the present disclosure, this difference may be advantageously applied to allow for different vector sequencing, novel exposure strategies, etc., to optimize the incidence angle and produce higher quality parts. Build floor 201 may have a rotational motion or rotate such that the platform depth 250 of build floor 201 moves in a downward direction, and may move at any rate. For example, build floor 201 may move between 5 microns and 5000 microns per minute, between 50 and 500 microns per minute, between 100 and 150 microns per minute, or any rate desired, without departing from the scope of the present disclosure.

In an aspect of the present disclosure, the distance from the powder surface to the optics may also be reduced. This may be achieved by reducing the incidence angle and/or the operating region of each laser, using a build volume segmenting approach and to enable optic arrangements that are more compact (i.e., offset, slightly angled, etc.). Reducing this distance may also allow other benefits, such as reducing the volume of the build chamber, reducing the volume of inert gas, reducing the pumping power, potentially creating more laminar flow to improve performance, etc.

Because build floor 201 rotates downward, platform knife 223 and powder egress holes 215 are positioned below the build depth 253 of PBF system 200 to remove powder from PBF system 200 and build piece 219 from build floor 201. With a given thread pitch on a screw used for rotation of the build floor 201, any seals placed on build floor 201 can be positioned such that there is minimal contact between the seals and powder egress holes. Further, platform knife 223 can be oriented or dynamically changed to operate within the pitch of the rotational screw pitch used to rotate build floor 201.

Figure 3:
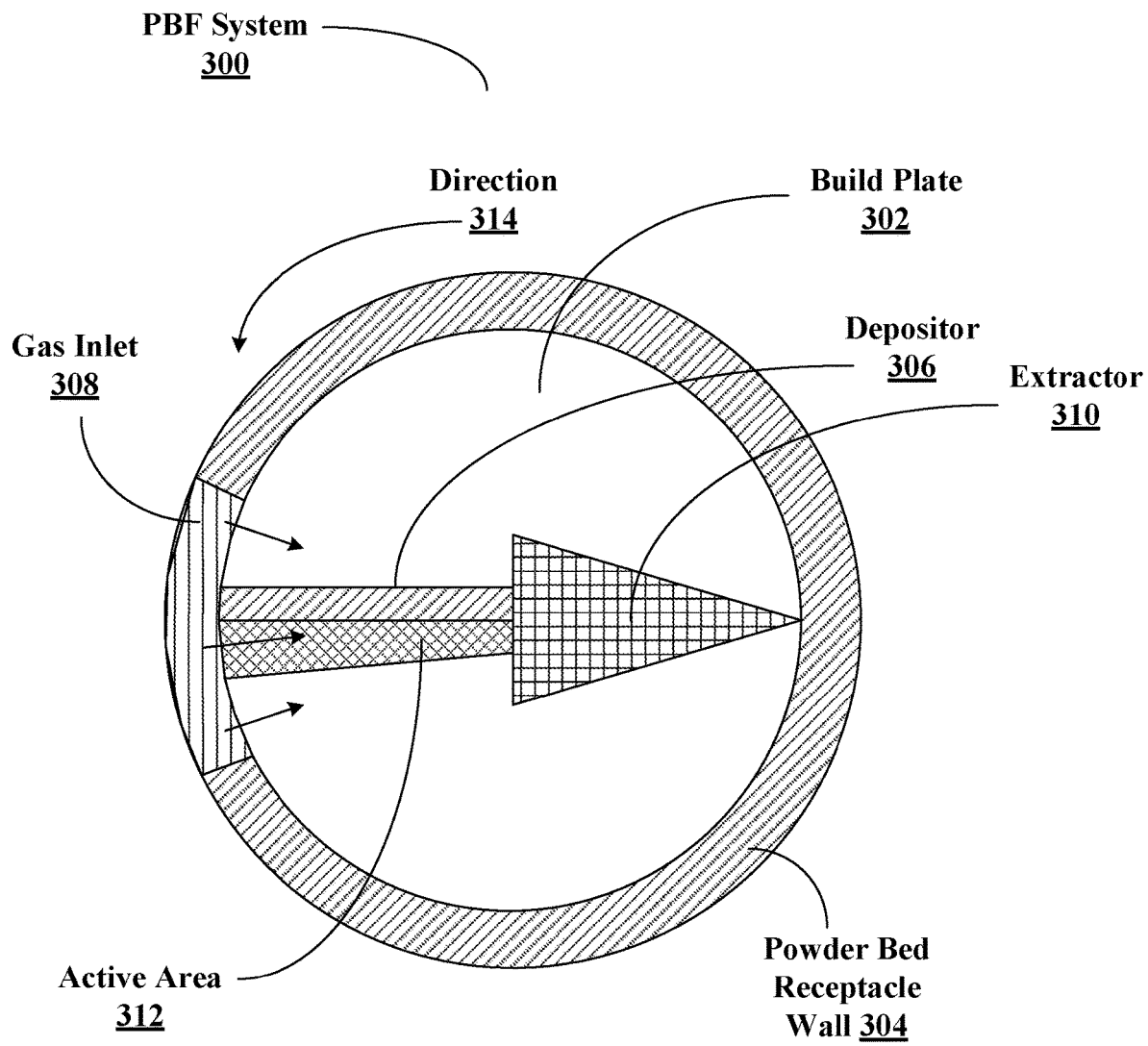
FIG. 3 illustrates a top view of a PBF system in accordance with an aspect of the present disclosure.

FIG. 3 illustrates a top view of a PBF system in accordance with an aspect of the present disclosure.

PBF system 300, may comprise a build plate 302, a powder bed receptacle wall 304, a depositor 306, and a gas flow system that includes one or more gas inlets 308 and an extractor 310. Active area 312 is shown to indicate the area for energy beams, e.g., lasers, etc. to sinter or fuse powder deposited by depositor 306.

In an aspect of the present disclosure, as depositor 306 (which may include a leveler to level the powder level) deposits a layer of powder, build plate 302 rotates in direction 314, and the layer of powder deposited by depositor 306 is exposed in active area 312. One or more energy beams then fuse or sinter the powder in active area 312 to form a layer of a build piece.

The gas inlet 308 may provide gases, such as inert gases, as a gas flow, to remove the byproducts created by the energy beams operating in active area 312. These gases can be directed toward extractor 310, which may remove the byproducts and/or gases provided by gas inlet 308, from the active area 312. In this example, the gas flow system can direct the gas flow substantially parallel to the radius of the rotational motion, i.e., substantially orthogonal to the direction of rotation. In an aspect of the present disclosure, gas flow in and around the active area 312 can be controlled by controlling the rate and amount of gas flow from gas inlet 308 and removal of gases by extractor 310, which may reduce the impact of soot, byproducts of the fusing process, splatter, etc. from affecting the printing process. Further, meltpool vectors of fusing performed in the active area 312 can be controlled to be in a direction preferable to the gas flow.

As described herein, gas inlet 308 and extractor 310 may provide a gas flow system for PBF system 300. Gas inlet 308 may be disposed or located around the build plate 302, and extractor 310 may be disposed or located at or near an axis of rotation of the build plate 302. Gas inlet 308 may collectively surround the build plate 302. Such a gas flow system may allow for the flow of introduced gases across active area 312, removal of soot, fumes, spatter, and/or other byproducts of the build process from the active area 312, other gas flow controls, or any combination thereof, without departing from the scope of the present disclosure. Such a gas flow may be linear, rotated, or otherwise controlled to provide a desired gas flow across active area 312.

Figure 4:
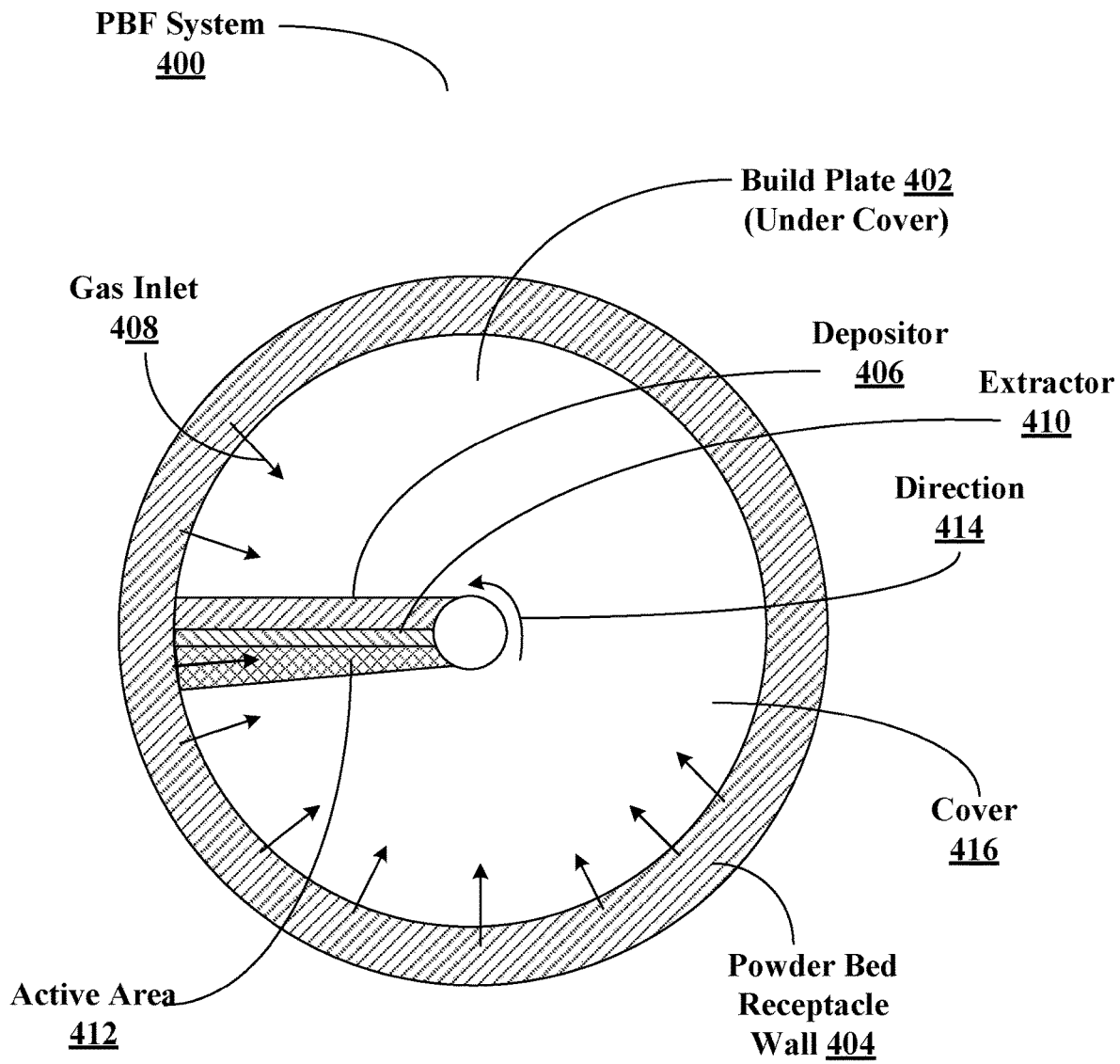
FIG. 4 illustrates a top view of a PBF system in accordance with an aspect of the present disclosure.

FIG. 4 illustrates a top view of a PBF system in accordance with an aspect of the present disclosure.

PBF system 400, may comprise a build plate 402, a powder bed receptacle wall 404, a depositor 406, and a gas flow system that includes one or more gas inlets 408 and an extractor 410. Active area 412 is shown to indicate the area for energy beams, e.g., lasers, etc. to sinter or fuse powder deposited by depositor 406.

In an aspect of the present disclosure, rather than build plate 402 rotating as described with respect to FIG. 3, depositor 406, extractor 410, and active area 412 may rotate or move in an arc motion with respect to the build plate 402. After depositor 406 (which may include a leveler to level the powder level) deposits a layer of powder, the depositor 406, extractor 410, and active area 412 rotate in direction 414, and the layer of powder deposited by depositor 406 is exposed in active area 412. Energy beams then fuse or sinter the powder in active area 412. Other combination of rotational motions and/or stationary portions of PBF system 300 are possible without departing from the scope of the present disclosure.

The gas inlet 408 may provide gases, such as inert gases, or a gas flow, to remove the byproducts created by the energy beams operating in active area 412. These gases can be directed toward extractor 410, and may be located in powder bed receptacle wall 404, to help remove the byproducts and/or gases provided by gas inlet 408, from the active area 412. In an aspect of the present disclosure, gas flow in and around the active area 412 can be controlled by controlling the rate and amount of gas flow from gas inlet 408 and removal of gases by extractor 410, which may reduce the impact of soot, byproducts of the fusing process, splatter, etc. from affecting the printing process. Further, meltpool vectors of fusing performed in the active area 412 can be controlled to be in a direction preferable to the gas flow.

As described herein, gas inlet 408 and extractor 410 may provide a gas flow system for PBF system 400. Gas inlet 408 may be disposed or located around the build plate 302, and extractor 310 may be disposed or located at or near an axis of rotation of the build plate 302. Gas inlet 308 may collectively surround the build plate 302. Such a gas flow system may allow for the flow of introduced gases across active area 312, removal of soot, fumes, spatter, and/or other byproducts of the build process from the active area 312, other gas flow controls, or any combination thereof, without departing from the scope of the present disclosure.

With respect to FIG. 4, a cover 416 may be provided over some or all of the build plate 402. For embodiments in which only a portion of the powder bed is actively fused in active area 412, the remainder of the print/build area may be covered with cover 416 to protect the powder bed from spatter and/or other byproducts from the printing process. In various embodiments the cover 416 may be heated, e.g., may include heating elements on the underside of the cover, facing the powder bed to control cooling of the fused powder. In various embodiments, a portion of the cover 416 may be configured to heat up the deposited powder before fusing in the active area 412.

In various embodiments, sensors can be positioned above the bed to, for example, detect defects in the build piece or other characteristics of the powder, build piece, or other conditions. For example, eddy current sensors may be used. If a defect is detected, an area within the active area 412 can be a dedicated remelting area. In this case, for example, another energy beam(s) can expose this "remelt" area to remelt portions of the build piece that the sensor(s) detected a defect, such as a crack. Sensors may be included in cover 416, for example.

Figure 5:
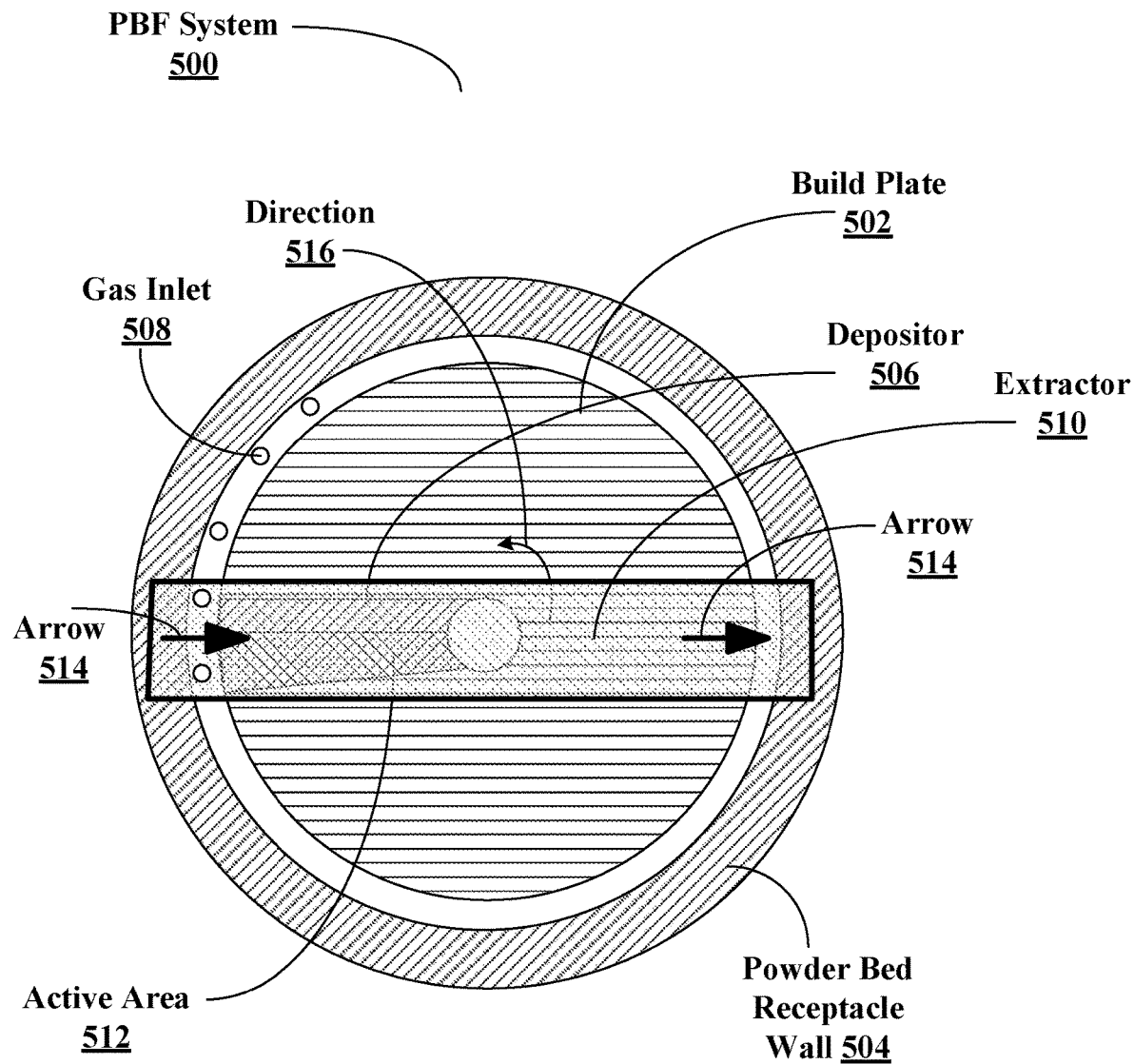
FIG. 5 illustrates a top view of a PBF system in accordance with an aspect of the present disclosure.

FIG. 5 illustrates a top view of a PBF system in accordance with an aspect of the present disclosure.

PBF system 500, may comprise a build plate 502, a powder bed receptacle wall 504, a depositor 506, and a gas flow system that includes one or more gas inlets 508 and an extractor 510. Active area 512 is shown to indicate the area for energy beams, e.g., lasers, etc. to sinter or fuse powder deposited by depositor 506.

In an aspect of the present disclosure, gas inlets 508 may be located in powder bed receptacle wall 504, and extractor 510 may direct the flow of gas from gas inlets 508 across the active area 512 as shown by arrows 514.

In an aspect of the present disclosure, build plate 502 may rotate in direction 516. In another aspect of the present disclosure, rather than build plate 502 rotating, depositor 506, extractor 510, and active area 512 may rotate. After depositor 506 (which may include a leveler to level the powder level) deposits a layer of powder, the depositor 506, extractor 510, and active area 512 rotate in direction 516, and the layer of powder deposited by depositor 506 is exposed in active area 512. Energy beams then fuse or sinter the powder in active area 512. In another aspect of the present disclosure, build plate 502 and extractor 510 may rotate. As extractor 510 rotates across the gas inlets 508, extractor may direct gas from gas inlets 508 along extractor and across active area 512, or other areas of the deposited powder, as desired. In this example, the gas flow system can direct the gas flow substantially parallel to the radius of the rotational motion, i.e., substantially orthogonal to the direction of rotation.

The gas inlet 508 may provide gases, such as inert gases, or a gas flow, to remove the byproducts created by the energy beams operating in active area 512. These gases can be directed toward extractor 510. In an aspect of the present disclosure, gas inlets 508 may be located in powder bed receptacle wall 504, and extractor 510 may be configured to help remove the byproducts and/or gases provided by gas inlet 508 from the active area 512. In an aspect of the present disclosure, gas flow in and around the active area 512 can be controlled by controlling the rate and amount of gas flow from gas inlet 508 and removal of gases by extractor 510, which may reduce the impact of soot, byproducts of the fusing process, splatter, etc. from affecting the printing process. Further, meltpool vectors of fusing performed in the active area 512 can be controlled to be in a direction preferable to the gas flow.

Figure 6:
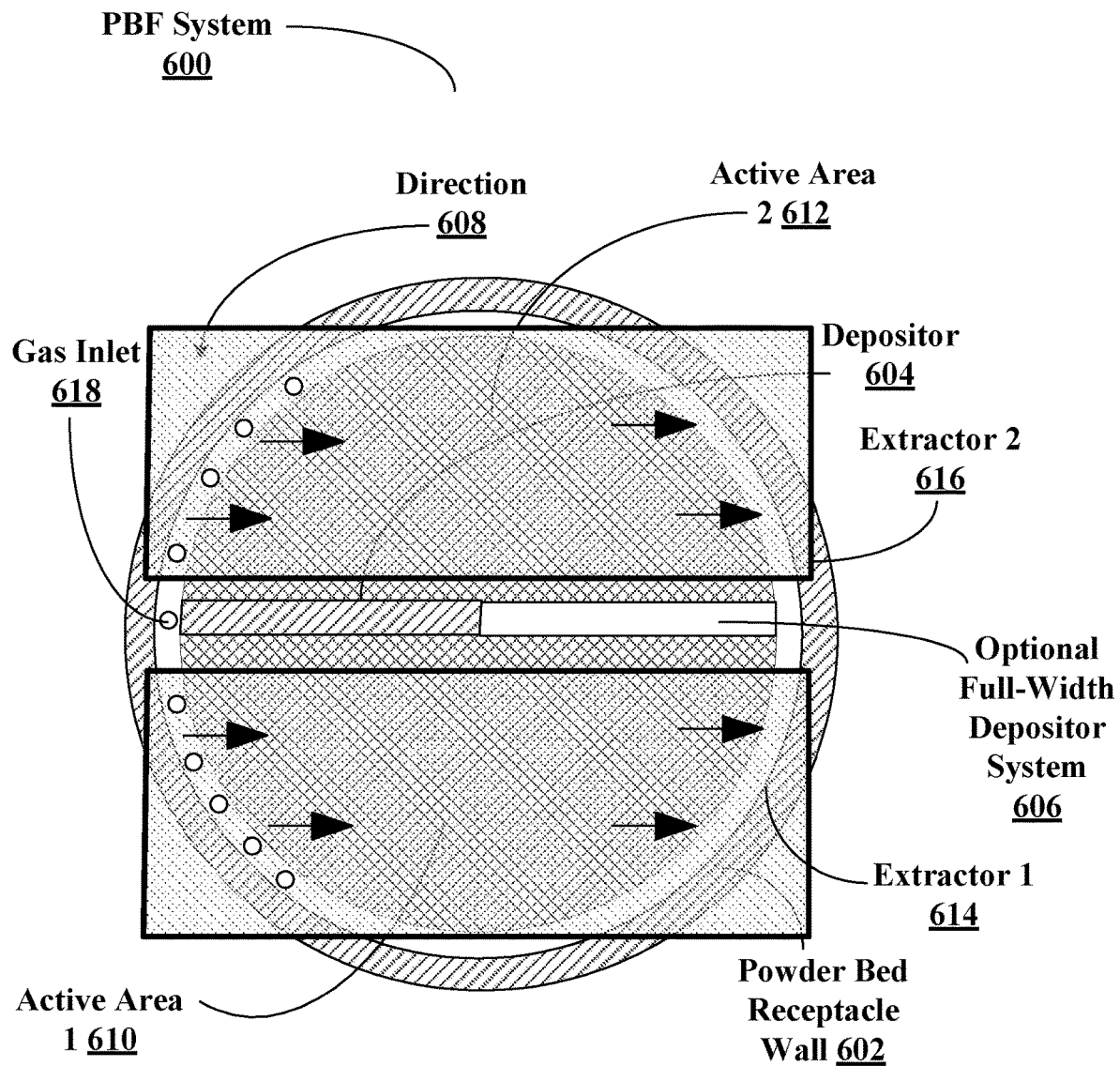
FIG. 6 illustrates a top view of a PBF system in accordance with an aspect of the present disclosure.

FIG. 6 illustrates a top view of a PBF system in accordance with an aspect of the present disclosure.

As shown in FIG. 6, PBF system 600 may include a powder bed receptacle wall 602, which may enclose a depositor 604 and, optionally, a full width depositor system 606. Full width depositor system 606 may be considered to include two depositors because it deposits powder in two separate locations. As the build plate rotates in direction 608, two active areas may be operating: active area 1 610 and active area 2 612, which may be operated on by different optics and/or different energy beams. A gas flow system may include a gas inlet 618, an extractor 1 (614), and an extractor 2 (616). Each active area 610 and 612 may have an independent extractor, e.g., extractor 1 614 for active area 1 610 and extractor 2 616 for active area 2 612. Active area 1 610 and active area 2 612 may be overlapping or non-overlapping. Depositor 604 and depositor system 606 may deposit powder simultaneously or at different times as desired.

In an aspect of the present disclosure, multiple active areas may have independent gas streams from various gas inlets 618, optics, and/or operated in conjunction to increase the print speed of a given part. In such an aspect, the flexibility to rapidly print some portions of a given part, and slowly print other sections within the same "slice", may increase the production efficiency of the overall part. Further, gas inlets 618, which are shown as being imbedded in powder bed receptacle wall 602, may be provided as part of extractor 1 612, extractor 2 614, or as a separate system.

In the embodiment of FIG. 6, PBF system 600 can allow the layer thickness of the fused deposited powder to be varied during a build of the build piece. In the present embodiment, a full-width depositor system 606 is used, so that powder is deposited in two locations that are 180 degrees apart (i.e., the left side and right side as viewed in FIG. 6). In this embodiment, the build plate is lowered 100 μm per full rotation, therefore each side of full-width depositor system 606 deposits a 50 μm layer of powder. The layer thickness that is fused can be selected as either 50 μm or 100 μm by choosing to fuse either in both active areas or in a single active area, respectively. For example, PBF system 600 may determine that a first portion of a build piece, e.g., near the outside edges, is to be printed at the finer resolution of 50 μm so the finished build piece will have smoother walls. However, PBF system 600 may determine that a second portion of the build piece, e.g., the interior, or bulk of the build piece, can be printed at the lower resolution of 100 μm. Therefore, PBF system 600 can select to fuse the first portion of the build piece by fusing in both active area 1 (610) and active area 2 (612). In other words, the portion of the build piece near the outside edges will be formed by fusing a 50 μm layer of powder twice per rotation. Likewise, PBF system 600 can select to fuse the second portion of the build piece by fusing in only a single active area, e.g., active area 2 (612). In other words, the interior, bulk portion of the build piece will be formed by fusing a 100 μm layer of powder once per rotation. In this way, for example, the time spent actively scanning the lower resolution portions of the build piece can be cut in half, which can allow faster build times because the speed of the rotation can be increased and/or more build pieces may be printed in the same build job.

While the example layer thicknesses of 50 μm and 100 μm are used as examples, it is understood that this example embodiment using a full-width depositor (e.g., two depositors 180 degrees apart) can provide a selection of fusing two layer thicknesses, in general, that are X and 2× thicknesses, i.e., a given thickness and double the given thickness.

The example embodiment of FIG. 6 can include a full-width depositor system 606 (depositing twice at 180 degrees apart), but other embodiments may include other configurations of depositors, as one skilled in the art will readily recognize. For example, three depositors that are each 120 degrees apart and three corresponding active areas could be used. In this example, if the build plate is lowered 100 µm in one a full rotation, the fused layer thicknesses can be selected among 33.3 µm, 66.6 µm, and 100 µm by fusing every active area (three times per rotation), every other active area (alternating once and twice per rotation), or every third active area (once per rotation), respectively.

Figure 7:
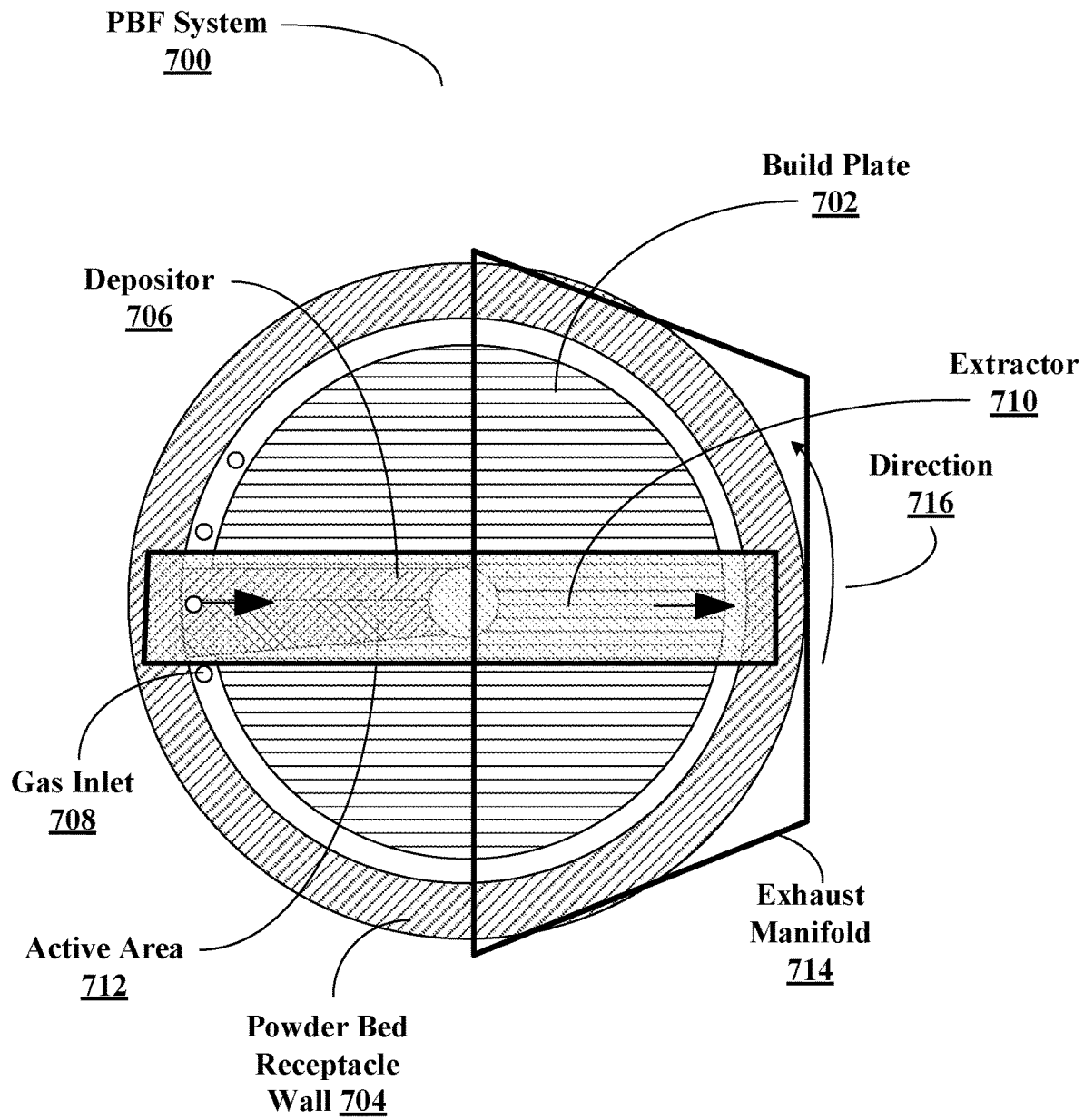
FIG. 7 illustrates a top view of a PBF system in accordance with an aspect of the present disclosure.

FIG. 7 illustrates a top view of a PBF system in accordance with an aspect of the present disclosure.

PBF system 700, may comprise a build plate 702, a powder bed receptacle wall 704, a depositor 706, and a gas flow system that includes one or more gas inlets 708, and an extractor 710, and an exhaust manifold 714. Active area 712 is shown to indicate the area for energy beams, e.g., lasers, etc. to sinter or fuse powder deposited by depositor 706.

FIG. 7 illustrates an aspect of the present disclosure where extractor 710 may direct a gas flow from gas inlet 708 through and/or across extractor 710, while exhaust manifold 714 may remove additional fumes, soot, and/or other byproducts from the sintering or fusing process performed by the energy beam(s) impinging on the powder bed deposited on build plate 702. While extractor 710 may remove some of the fumes, soot, and/or other by products, the gas flow from gas inlet(s) 708 and gas flow through extractor 710 may not be positioned properly to remove enough byproducts, or the byproducts may still be emitting from the melt pools after rotation of the build plate 702 in direction 716. As such, exhaust manifold 714 may be used to remove additional fumes, soot, and/or other byproducts from the PBF system 700, which may increase the efficiency of PBF system 700. In this example, the gas flow system can direct the gas flow substantially parallel to the radius of the rotational motion, i.e., substantially orthogonal to the direction of rotation.

In an aspect of the present disclosure, rather than build plate 702 rotating, depositor 706, extractor 710, and active area 712 may rotate. As depositor 706 (which may include a leveler to level the powder level) deposits a layer of powder, the depositor 706, extractor 710, and active area 712 rotate in direction 716, and the layer of powder deposited by depositor 706 is exposed in active area 712. Energy beams then fuse or sinter the powder in active area 712.

In such an aspect, the gas flow system may be rotating as well, such that gas inlets 708 may be configured such that gas flows only in select areas, e.g., across active area 712 that is being processed by the energy beam. This selective gas flow may mitigate soot and other components formed during the fusion process from contaminating the inactive areas of the build plate, as the gas flow would be constrained. The rotational speed of the build plate 702, and/or the rotation of the above-the-bed systems, may be synchronized with the opening and closing of gas inlets 708 to allow for selection of variable gas flows across active area 712 and/or other areas within PBF system 700.

In an aspect of the present disclosure, gas flow in and around the active area 712 can be controlled by controlling the rate and amount of gas flow from gas inlet 708 and removal of gases by extractor 710, as well as removal of gases through exhaust manifold 714, which may reduce the impact of soot, byproducts of the fusing process, splatter, etc. from affecting the printing process. Further, meltpool vectors of fusing performed in the active area 712 can be controlled to be in a direction preferable to the gas flow.

Figure 8:
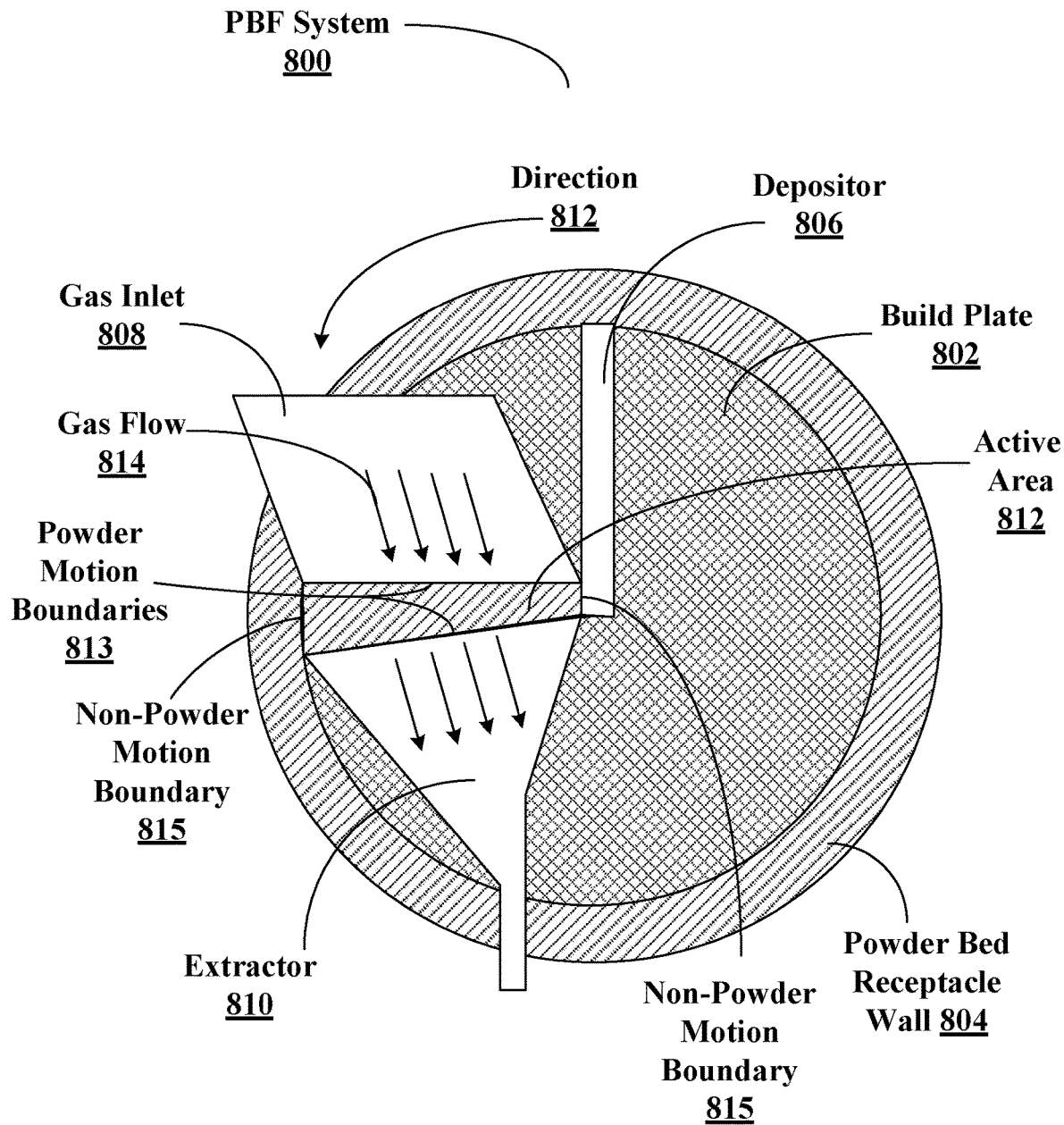
FIG. 8 illustrates a top view of a PBF system in accordance with an aspect of the present disclosure.

FIG. 8 illustrates a top view of a PBF system in accordance with an aspect of the present disclosure.

PBF system 800, may comprise a build plate 802, a powder bed receptacle wall 804, a depositor 806, and a gas flow system that includes a gas inlet 808 and an extractor 810. Active area 812 is shown to indicate the area for energy beams, e.g., lasers, etc. to sinter or fuse powder deposited by depositor 806. Active area 812 has two powder motion boundaries 813 and two non-powder motion boundaries 815. Powder motion boundaries are boundaries of an active area across which the underlying powder layer moves, and non-powder motion boundaries are boundaries of an active area across which underlying powder does not move. In other words, as build plate 802 rotates, the powder layer moves across one of the powder motion boundaries 813 into active area 812, but the powder layer does not move across either of the non-powder motion boundaries 815. Likewise, as build plate 802 continues to rotate, the powder layer (portions of which may now be fused) moves out of active area 812 across the other of the powder motion boundaries 813, but does not move across either of the non-powder motion boundaries. The distinction between powder motion boundaries and non-powder motion boundaries is described to illustrate how different gas flow systems can direct gas flow in different ways to achieve different benefits. In the present example of FIG. 8, the gas flow system components, i.e., gas inlet 808 and extractor 810, can be positioned substantially at the powder motion boundaries, which may allow a more laminar gas flow to be applied across active area 812 because the gas inlet and extractor can be placed close together due to the slim arc area of the active area. In this regard, in various embodiments, the active area may be, for example, an arc area of less than 45 degrees, 40 degrees, 35 degrees, 30 degrees, 25 degrees, 20 degrees, 15 degrees, 10 degrees, 5 degrees, or 3 degrees. In the present embodiment, it is noted that the powder motion boundaries 813 are radial boundaries of the active area with respect to the rotational motion, and the non-powder motion boundaries 815 are circumferential boundaries (an inner circumference and an outer circumference) with respect to the rotational motion. Also, it is noted that in the present example of FIG. 8, the gas flow system can direct the gas flow substantially parallel to the direction of rotation, i.e., substantially orthogonal to the radius of the rotational motion.

It is noted that in various other examples, e.g., FIG. 3, FIG. 5, FIG. 7, and FIG. 10, the gas flow systems position the gas inlet(s) and extractors substantially at the non-powder motion boundaries (not expressly marked in the figures, but readily understandable to one skilled in the art).

In an aspect of the present disclosure, and as shown in FIG. 8, depositor 806 may be placed anywhere within the PBF system 800 that is not interfering with the gas flow system or the active area, and is not necessarily adjacent to active area 812. Similar configurations where the depositor may be configured anywhere within the PBF system may be employed with respect to any PBF system described herein without departing from the scope of the present disclosure.

As shown in FIG. 8, gas inlet 808 may be configured to direct gas flow 814 across active area 812 in a direction other than from the powder bed receptacle wall 804 towards the center of PBF system 800. In various embodiments, a gas inlet and an extractor may be configured to direct the gas flow at other angles, or at variable angles, or rotate or otherwise direct the gas flow depending on the material being processed by PBF system 800.

Figure 9:
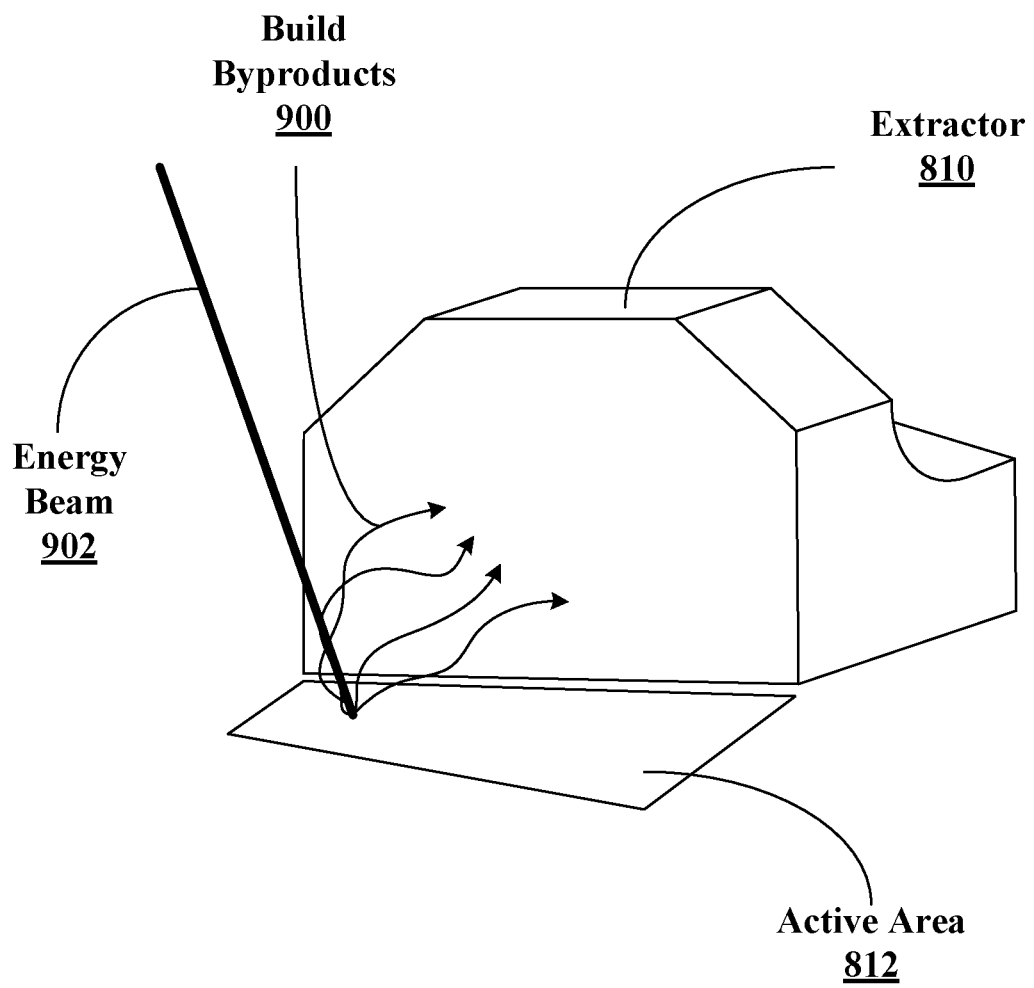
FIG. 9 shows a perspective view of an extractor in accordance with an aspect of the present disclosure.

FIG. 9 shows a perspective view of an extractor in accordance with an aspect of the present disclosure. Using the example of extractor 810 of FIG. 8, although any extractor described herein can be configured as described with respect to FIG. 9, extractor 810 may remove build byproducts 900, e.g., soot, fumes, spatter, etc. from active area 812. Build byproducts may be created when energy beam 902 impinges upon powder such that the powder is sintered or fused. in an aspect of the present disclosure, extractor 810 (or any extractor described herein) may be configured to have a height, width, and/or shape such that build byproducts 900 are captured within extractor 810 instead of being re-deposited on the powder layer, whether processed or unprocessed. For example, and not by way of limitation, extractor 810 may take on a funnel shape as shown, or any shape such that the gases are removed. Removal of build byproducts 900 from the powder layer on the build plate may increase the repeatability of the build process.

Figure 10:
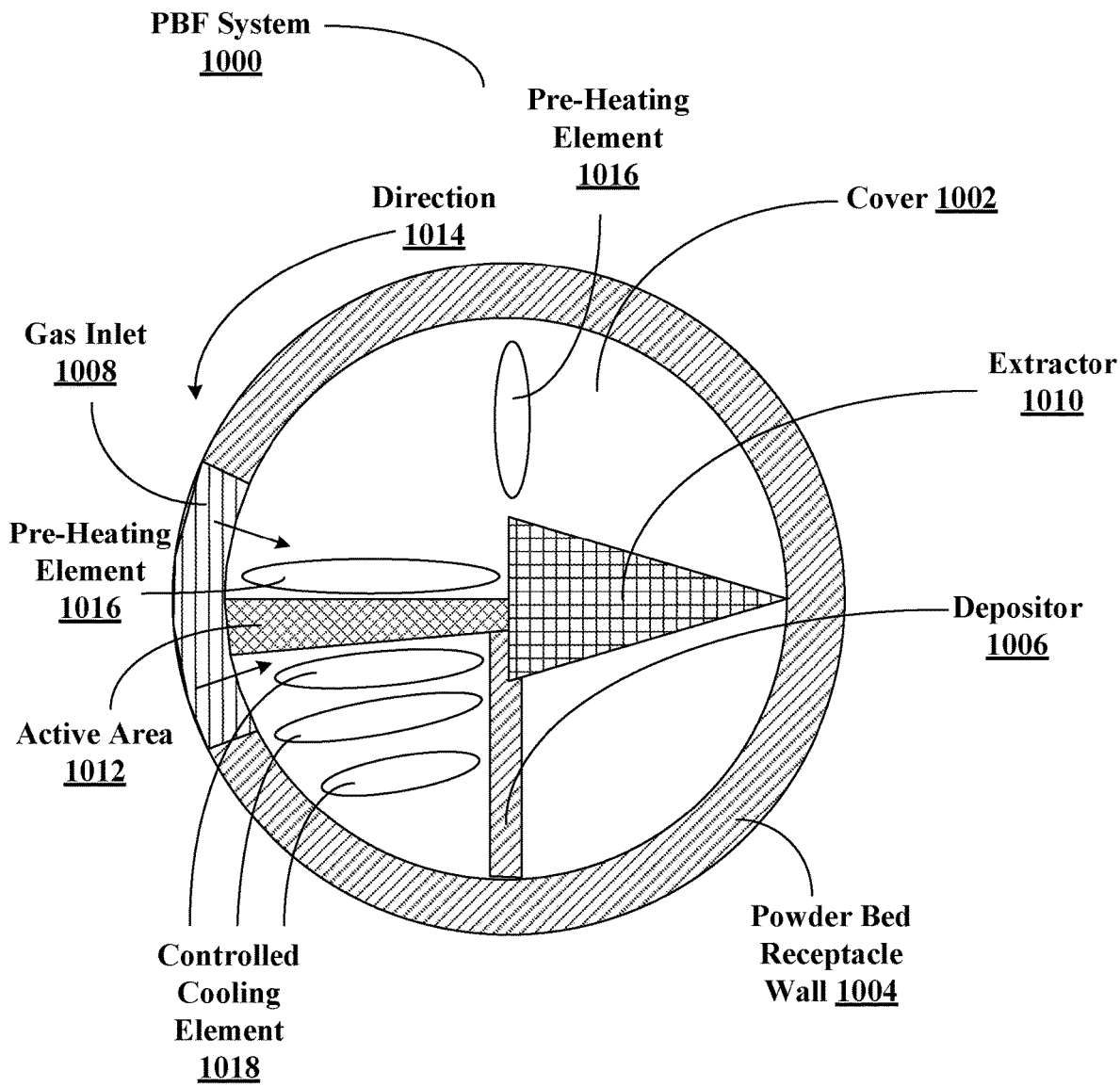
FIG. 10 illustrates a top view of a PBF system in accordance with an aspect of the present disclosure.

FIG. 10 illustrates a top view of a PBF system in accordance with an aspect of the present disclosure.

PBF system 1000, may comprise a cover 1002 (that can cover the powder bed in areas other than the active area and where the depositor deposits powder), a powder bed receptacle wall 1004, a depositor 1006, and a gas flow system including a gas inlet 1008 and an extractor 1010. Active area 1012 is shown to indicate the area for energy beams, e.g., lasers, etc. to sinter or fuse powder deposited by depositor 1006. A build plate (which may be similar to those shown in FIGS. 2-8) receives powder deposited by depositor 1006 and rotates in direction 1014 to expose different areas of deposited powder in active area 1012.

In an aspect of the present disclosure, cover 1002 may protect the underlying powder bed and/or already fused/sintered portions of the component being built from spatter, soot, etc. In an aspect of the present disclosure, cover 1002 may include one or more heating elements, i.e. pre-heating elements 1016, to pre-heat the powder bed. Cover 1002 may also optionally include one or more elements, i.e., controlled cooling element 1018, to control cooling of the fused powder after fusing within the active area 1012. Such cooling elements may be coupled to the cover 1002 such that elements 1016 and/or 1018 face the build plate and powder bed.

For example, and not by way of limitation, one or more pre-heating elements 1016 may be used to heat a portion of the powder bed prior to that portion entering the active area 1012. After fusing, one or more controlled cooling elements 1018 may create a thermal gradient having a high starting temperature and a steadily reducing temperature to control the cooling of the fused portions of the component as the powder bed rotates away from the active area 1012.

Cover 1002 may include various openings, e.g., such that active area 1012 is able to receive energy beams from one or more energy sources, an opening for depositor 1006 to deposit powder, openings for extractor 1010 to extract gases or byproducts of the build process, etc.

Cover 1002 may also include other components, e.g., temperature sensors, cameras, etc. to monitor the build process. As such, pre-heating element 1016 and/or controlled cooling element 1018 may not be a heater, but may be a camera, eddy current sensor, etc. to assist in the build process, e.g., detect defects in the built piece, monitor powder layer deposition, etc. In various embodiments, if a defect is detected, the PBF system 1000 may include an additional active area (not shown) to be a dedicated repair area, while other areas may be continuing to build, or multiple active areas can be assigned various tasks as described with respect to FIG. 6. For example, if a defect (such as a void or crack) in the build piece is detected by a sensor, the additional active area may be used to re-melt the area of the defect in order to fix the defect.

In an aspect of the present disclosure, the build plate and powder/fused portion of the component may not rotate, but the "above the bed" systems can rotate. In this case, for example, the depositor(s), energy beam(s) system, gas flow system, sensor(s), etc., e.g., the devices and systems "above the bed", can rotate at the same rate, such that they remain fixed relative to each other. In some embodiments, the build chamber may include channels for gas inlets and outlets.

Figure 11:
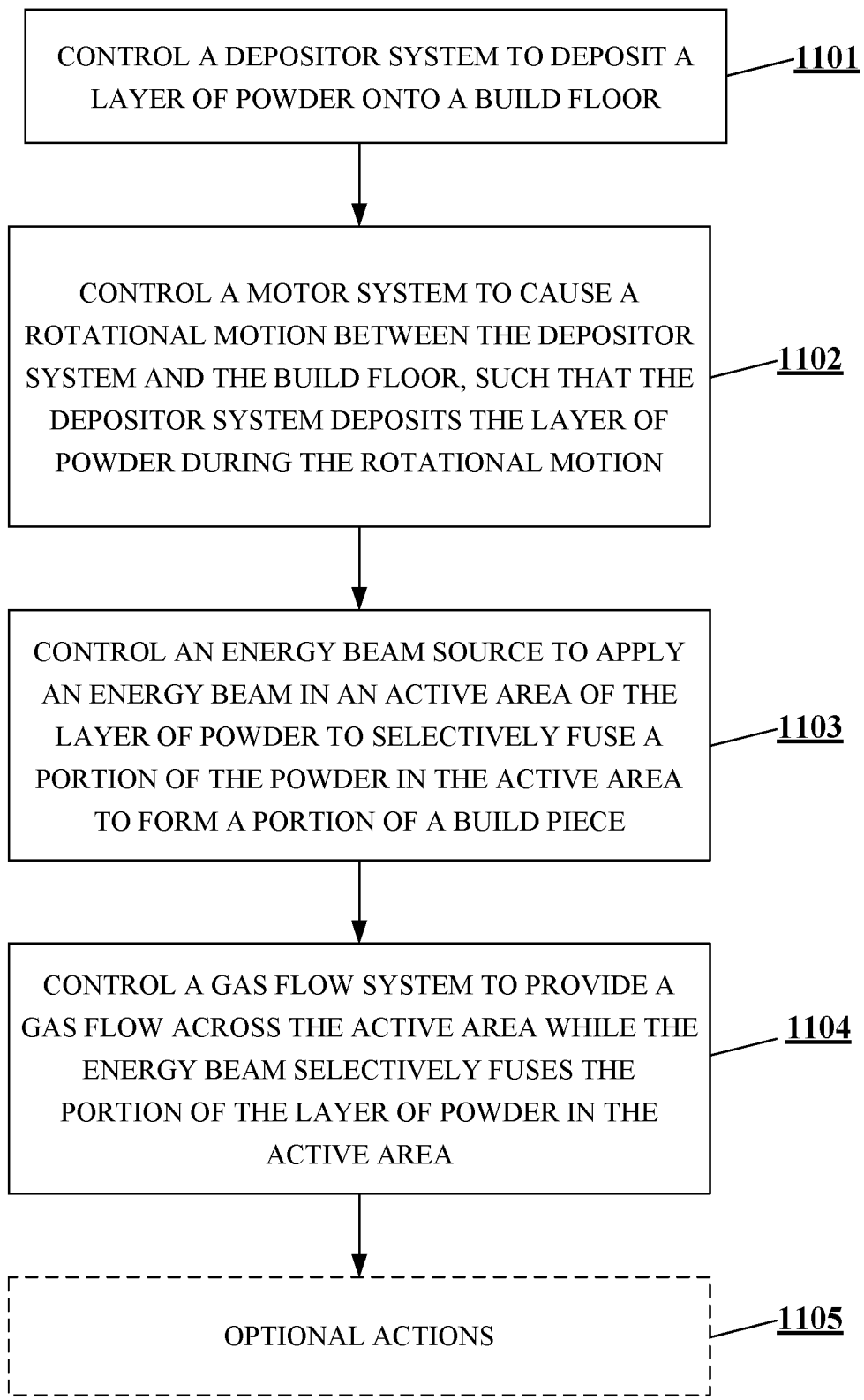
FIG. 11 illustrates an example method in accordance with an aspect of the present disclosure.

FIG. 11 illustrates a flowchart of an example method of additively manufacturing a build piece according to various embodiments. The example method includes controlling a depositor system (1101) to deposit a layer of powder onto a build floor, controlling a motor system (1102) to cause a rotational motion between the depositor system and the build floor, such that the depositor system deposits the layer of powder during the rotational motion, and a receptacle wall contains the powder on the build floor, controlling an energy beam source (1103) to apply an energy beam in an active area of the layer of powder to selectively fuse a portion of the powder in the active area to form a portion of a build piece, and controlling a gas flow system (1104) to provide a gas flow across the active area while the energy beam selectively fuses the portion of the layer of powder in the active area. Controlling the motor system (1102) may be implemented by causing the rotational motion at least in part by rotating the build floor, and the depositor system may remain stationary during the rotational motion. Controlling the motor system (1102) may be implemented by causing the rotational motion at least in part by moving the depositor system in an arc over the build floor. The receptacle wall may be configured to remain stationary during the rotational motion. Controlling the gas flow system (1104) may extract a gas created by the fusing of the powder, as described above. The depositor system may include a plurality of depositors, and controlling the depositor system (1101) may include depositing a plurality of layers of powder simultaneously.

In various embodiments, the method can include one or more optional actions (1105), which is depicted as a dashed box in FIG. 11 to signify optionality. For example, an optional action (1105) may include covering a second area of the powder exclusive of the active area with a cover. In this way, for example, spatter, soot, etc. from the fusing may be prevented from falling onto portions of the powder bed or build piece. Another optional action (1105) may include controlling a heater configured to heat the powder under the cover, the heater being arranged in the cover. Another optional action (1105) may include controlling a sensor to sense a characteristic of the powder under the cover, wherein the sensor is arranged in the cover.

In various embodiments, controlling the gas flow system (1104) may include controlling a gas extractor arranged adjacent to a first boundary of the active area, the gas extractor being controlled to extract the gas flow, and may further include controlling a gas inlet arranged adjacent to a second boundary of the active area, the gas inlet being controlled to provide the gas flow. Controlling the gas flow system (1104) may include controlling a gas extractor arranged at an axis of rotation of the rotational motion, the gas extractor being controlled to extract the gas flow. Controlling the gas flow system (1104) may further include controlling a gas inlet arranged at a portion of the receptacle wall, the gas inlet being controlled to provide the gas flow, and the gas inlet may include a plurality of openings that collectively surround the build floor.

In various embodiments, the energy beam source may include one or more energy beam generators, controlling the energy beam source (1103) may include applying one or more energy beams in a plurality of active areas of the layer of powder to selectively fuse a portion of the powder in each of the active areas, and controlling the gas flow system (1104) may include providing a gas flow across each of the active areas while the one or more energy beams selectively fuse the portion of the powder in each active area. The active areas may be non-overlapping. In various embodiments, the gas flow system may include a funnel-type gas manifold.

In various embodiments, controlling the gas flow system (1104) may include rotating a direction of the gas flow. The gas flow system may include a plurality of gas inlets and a plurality of gas extractors, and controlling the gas flow system (1104) may include rotating the gas flow by opening and closing the gas inlets and the gas extractors.

In various embodiments, an optional action (1105) may include varying a layer thickness of the selectively fused deposited powder during a build of the build piece. For example, this optional action may further include obtaining information of a geometric feature density, and controlling the motor system (1102) may include varying a speed of the rotational motion based on the geometric feature density.

Figure 12:
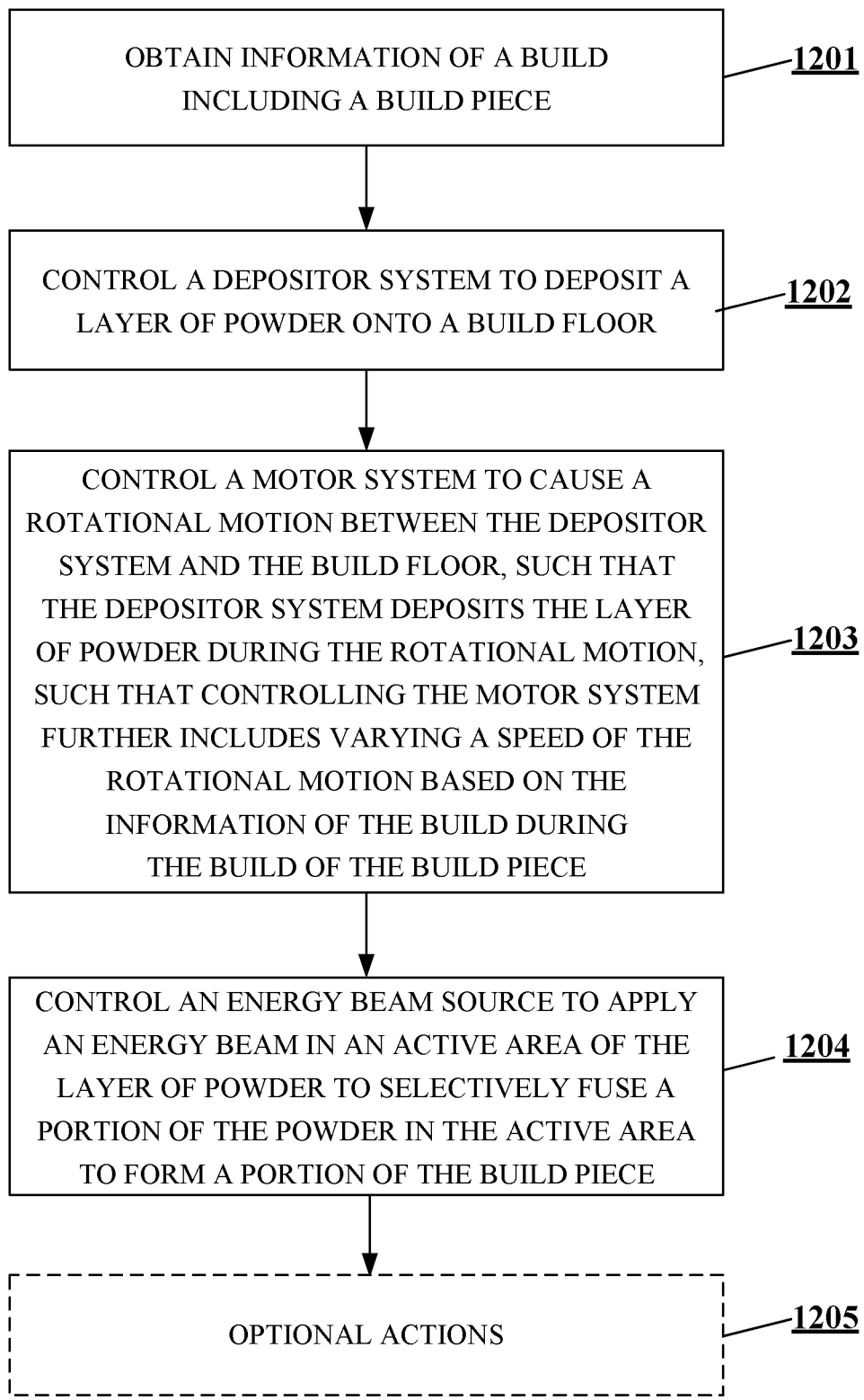
FIG. 12 illustrates another example method in accordance with an aspect of the present disclosure.

FIG. 12 illustrates a flowchart of an example method of additively manufacturing a build piece according to various embodiments. The example method includes obtaining information (1201) of a build including a build piece, controlling a depositor system (1202) to deposit a layer of powder onto a build floor, controlling a motor system (1203) to cause a rotational motion between the depositor system and the build floor, such that the depositor system deposits the layer of powder during the rotational motion, and a receptacle wall contains the powder on the build floor, where controlling the motor system (1203) further includes varying a speed of the rotational motion based on the information of the build during the build of the build piece, and controlling an energy beam source (1204) to apply an energy beam in an active area of the layer of powder to selectively fuse a portion of the powder in the active area to form a portion of the build piece. For example, the information of the build may include a geometric feature density, and controlling the motor system (1202) may include varying the speed based on the geometric feature density. For example, varying the speed of the rotational motion may include increasing the speed when the geometric feature density is low and decreasing the speed when the geometric feature density is high. In this way, for example, an active time of the energy beam source can be used more efficiently and the build time of the build can be reduced.

In various embodiments, controlling the motor system (1203) may cause the rotational motion at least in part by rotating the build floor. The depositor system may be configured to remain stationary during the rotational motion. In various embodiments, controlling the motor system (1203) may cause the rotational motion at least in part by moving the depositor system in an arc over the build floor. In various embodiments, the receptacle wall may be configured to remain stationary during the rotational motion. In various embodiments, the receptacle wall may be configured to rotate with the build floor. The depositor system may include a plurality of depositors, and controlling the depositor system (1202) may include depositing a plurality of layers of powder simultaneously.

In various embodiments, the method can include one or more optional actions (1205), which is depicted as a dashed box in FIG. 12 to signify optionality. For example, the method may include an optional action (1205) of controlling a gas flow system to extract a gas created by the fusing of the powder. In another example, the method may include an optional action (1205) of covering a second area of the powder exclusive of the active area with a cover. In this way, for example, spatter, soot, etc. from the fusing may be prevented from falling onto portions of the powder bed or build piece. Another optional action (1205) may include controlling a heater configured to heat the powder under the cover, the heater being arranged in the cover. Another optional action (1205) may include controlling a sensor to sense a characteristic of the powder under the cover, wherein the sensor is arranged in the cover. Another optional action (1205) may include controlling a gas flow system. For example, a gas flow system may include a gas extractor arranged adjacent to a first boundary of the active area, the gas extractor being controlled to extract a gas flow. The gas flow system may include a gas inlet arranged adjacent to a second boundary of the active area, and controlling the gas flow system may further include controlling the gas inlet to provide the gas flow. Controlling a gas flow system may include controlling a gas extractor arranged at an axis of rotation of the rotational motion, wherein the gas extractor is controlled to extract a gas flow. The gas flow system may include a gas inlet arranged at a portion of the receptacle wall, and controlling the gas flow system may include controlling the gas inlet to provide the gas flow. The gas inlet may include a plurality of openings that collectively surround the build floor.

In various embodiments, the energy beam source may include one or more energy beam generators, and controlling the energy beam source (1204) may include applying one or more energy beams in a plurality of active areas of the layer of powder to selectively fuse a portion of the powder in each of the active areas, and an optional action (1205) may include controlling a gas flow system to provide a gas flow across each of the active areas while the one or more energy beams selectively fuse the portion of the powder in each active area. The active areas may be non-overlapping. The gas flow system may include a funnel-type gas manifold. Controlling a gas flow system may include rotating a direction of the gas flow across the active area. For example, controlling the gas flow system may include controlling a plurality of gas inlets and a plurality of gas extractors such that the gas flow system rotates the gas flow by opening and closing the gas inlets and the gas extractors. An optional action (1205) may include varying a layer thickness of the selectively fused deposited powder during a build of the build piece.

Figure 13:
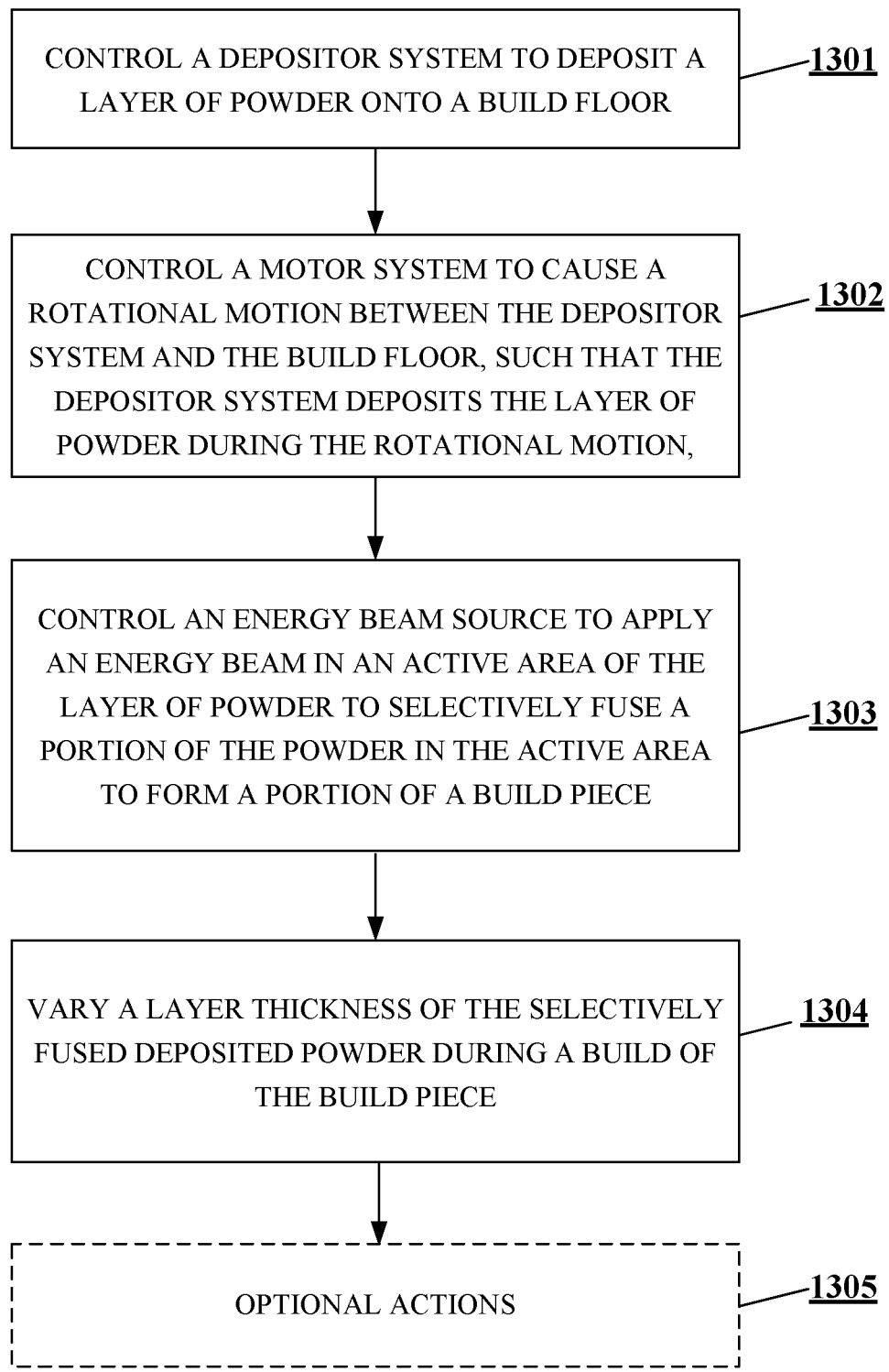
FIG. 13 illustrates another example method in accordance with an aspect of the present disclosure.

FIG. 13 illustrates a flowchart of an example method of additively manufacturing a build piece according to various embodiments. The example method includes controlling a depositor system (1301) to deposit a layer of powder onto a build floor, controlling a motor system (1302) to cause a rotational motion between the depositor system and the build floor, such that the depositor system deposits the layer of powder during the rotational motion, and a receptacle wall contains the powder on the build floor, controlling an energy beam source (1303) to apply an energy beam in an active area of the layer of powder to selectively fuse a portion of the powder in the active area to form a portion of a build piece, and varying a layer thickness (1304) of the selectively fused deposited powder during a build of the build piece.

In various embodiments, the depositor system may include a plurality of depositors, and controlling the depositor system (1301) may include controlling the plurality of depositors to deposit layers of powder simultaneously. The active area may include a plurality of active areas, each arranged after a different depositor of the plurality of depositors. A first depositor in the plurality of depositors may be arranged 180 degrees apart from a second depositor with respect to the rotational motion, the first depositor may be associated with a first active area of the plurality of active areas arranged after the first depositor, and the second depositor may be associated with a second active area of the plurality of active areas arranged after the second depositor. Varying the layer thickness (1304) of the selectively fused deposited powder may include controlling the energy beam source to fuse some portions of the powder layer in both the first and second active areas and to fuse other portions of the powder layer in only the first or second active area. For example, controlling the energy beam source (1303) may include fusing a portion of the build piece near the edge of the build piece by fusing in both the first and second active areas, and fusing a portion of the build piece in the interior bulk of the build piece in only the first or second active area. Controlling the energy beam source (1303) may include applying a plurality of energy beams simultaneously in the plurality of active areas.

In various embodiments, controlling the motor system (1302) may cause the rotational motion at least in part by rotating the build floor. The depositor system may be configured to remain stationary during the rotational motion. In various embodiments, controlling the motor system (1302) may cause the rotational motion at least in part by moving the depositor system in an arc over the build floor. The receptacle wall may be configured to remain stationary during the rotational motion.

In various embodiments, the method can include one or more optional actions (1305), which is depicted as a dashed box in FIG. 13 to signify optionality. For example, an optional action (1305) may include controlling a gas flow system to provide a gas flow across the active area. The gas flow system may extract a gas created by the fusing of the powder. Another optional action (1305) may include covering a second area of the powder exclusive of the active area with a cover. Another optional action (1305) may include controlling a heater to heat the powder under the cover, the heater being arranged in the cover. Another optional action (1305) may include controlling a sensor to sense a characteristic of the powder under the cover, the sensor being arranged in the cover.

In various embodiments, an optional action (1305) may include controlling a gas flow system to provide a gas flow across one or more active areas. For example, the gas flow system may include a gas extractor arranged adjacent to a first boundary of the active area, such that gas extractor extracts a gas flow. The gas flow system may include a gas inlet arranged adjacent to a second boundary of the active area, the gas inlet being configured to provide the gas flow. A gas flow system may include a gas extractor arranged at an axis of rotation of the rotational motion, such that the gas extractor extracts a gas flow. A gas flow system may include a gas inlet arranged at a portion of the receptacle wall, the gas inlet being configured to provide the gas flow. The gas inlet may include a plurality of openings that collectively surround the build floor.

In various embodiments, the energy beam source may include one or more energy beam generators, and controlling the energy beam source (1303) may include applying one or more energy beams in a plurality of active areas of the layer of powder to selectively fuse a portion of the powder in each of the active areas, and an optional action (1305) may include controlling a gas flow system to provide a gas flow across each of the active areas while the one or more energy beams selectively fuse the portion of the powder in each active area. The active areas may be non-overlapping. A gas flow system may include a funnel-type gas manifold to provide a gas flow across the active area. Controlling a gas flow system may include rotating a direction of a gas flow across the active area. For example, The gas flow system may include a plurality of gas inlets and a plurality of gas extractors, and controlling the gas flow system may include rotating the gas flow by opening and closing the gas inlets and the gas extractors. In various embodiments, an optional action (1305) may include varying a speed of the rotational motion based on a geometric feature density.

One skilled in the art will appreciate that the processes and apparatuses described herein are simply illustrative examples of a systems that lie within the scope of the present disclosure, and that variations to the components and techniques described may be used without departing from the scope of the present disclosure.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   a build floor;
   a depositor system configured to deposit a layer of powder onto the build floor, wherein the depositor system includes a first depositor and a second depositor;
   a motor system configured to cause a rotational motion between the depositor system and the build floor, wherein the depositor system deposits the layer of powder during the rotational motion;
   a receptacle wall configured to contain the powder on the build floor; and
   an energy beam source configured to apply an energy beam in an active area of the layer of powder to selectively fuse a portion of the powder in the active area to form a portion of a build piece, wherein the active area includes a first active area arranged after the first depositor and a second active area arranged after the second depositor, wherein a layer thickness of the selectively fused deposited powder is varied, during a build of the build piece, by the energy beam source fusing some portions of the powder layer in both the first active area and the second active area and fusing other portions of the powder layer in only the first active area or the second active area.

2. The apparatus of claim 1, wherein the first depositor is arranged 180 degrees apart from the second depositor with respect to the rotational motion.

3. The apparatus of claim 1, wherein the energy beam source is configured to fuse a portion of the build piece near the edge of the build piece by fusing in both the first and second active areas, and is configured to fuse a portion of the build piece in the interior bulk of the build piece in only the first or second active area.

4. The apparatus of claim 1, wherein the energy beam source is further configured to apply a plurality of energy beams simultaneously in the first active area and the second active area.

5. The apparatus of claim 1, wherein the motor system causes the rotational motion at least in part by rotating the build floor.

6. The apparatus of claim 1, wherein the depositor system is configured to remain stationary during the rotational motion.

7. The apparatus of claim 1, wherein the motor system causes the rotational motion at least in part by moving the depositor system in an arc over the build floor.

8. The apparatus of claim 1, wherein the receptacle wall is configured to remain stationary during the rotational motion.

9. The apparatus of claim 1, further comprising a gas flow system configured to provide a gas flow across the active area.

10. The apparatus of claim 9, wherein the gas flow system extracts a gas created by the fusing of the powder.

11. The apparatus of claim 1, further comprising:
a cover configured to cover a second area of the powder exclusive of the active area.

12. The apparatus of claim 11, wherein the cover includes a heater configured to heat the powder under the cover.

13. The apparatus of claim 11, wherein the cover includes a sensor configured to sense a characteristic of the powder under the cover.

14. The apparatus of claim 1, further comprising a gas flow system including a gas extractor arranged adjacent to a first boundary of the active area, the gas extractor being configured to extract the gas flow.

15. The apparatus of claim 14, wherein the gas flow system further includes a gas inlet arranged adjacent to a second boundary of the active area, the gas inlet being configured to provide the gas flow.

16. The apparatus of claim 1, further comprising a gas flow system including a gas extractor arranged at an axis of rotation of the rotational motion, the gas extractor being configured to extract the gas flow.

17. The apparatus of claim 16, wherein the gas flow system further includes a gas inlet arranged at a portion of the receptacle wall, the gas inlet being configured to provide the gas flow.

18. The apparatus of claim 17, wherein the gas inlet includes a plurality of openings that collectively surround the build floor.

19. The apparatus of claim 1, wherein the energy beam source includes one or more energy beam generators, the energy beam source is configured to apply one or more energy beams in the first active area and the second active area to selectively fuse a portion of the powder in each of the active areas, and a gas flow system configured to provide a gas flow across each of the active areas while the one or more energy beams selectively fuse the portion of the powder in each active area.

20. The apparatus of claim 19, wherein the active areas are non-overlapping.

21. The apparatus of claim 1, further comprising a gas flow system including a funnel-type gas manifold.

22. The apparatus of claim 1, further comprising a gas flow system configured to rotate a direction of the gas flow.

23. The apparatus of claim 22, wherein the gas flow system includes a plurality of gas inlets and a plurality of gas extractors, and the gas flow system rotates the gas flow by opening and closing the gas inlets and the gas extractors.

24. The apparatus of claim 1, wherein a speed of the rotational motion is varied based on a geometric feature density.

25. The apparatus of claim 1, wherein the first depositor, the second depositor and a third depositor are each 120 degrees apart with respect to the rotational motion.

26. The apparatus of claim 1, wherein the energy beam source comprising a plurality of energy beams,
wherein the first depositor depositing a first thickness of the powder and the second depositor depositing a second thickness of the powder,
wherein a first energy beam of the plurality of energy beams fusing the first thickness of the powder in the first active area, a second energy beam of the plurality of energy beams fusing the second thickness of the powder in the second active area, and the first energy beam of the plurality of energy beams fusing the first thickness of the powder and the second thickness of the powder in the first active area.

27. The apparatus of claim 1, wherein the energy beam source selectively fusing the portions is configured to selectively fuse at least twice per a full rotation between the depositor system and the build floor.

28. A method, comprising:
controlling a depositor system to deposit a layer of powder onto a build floor, wherein the depositor system includes a first depositor and a second depositor;
controlling a motor system to cause a rotational motion between the depositor system and the build floor, wherein the depositor system deposits the layer of powder during the rotational motion, and a receptacle wall contains the powder on the build floor;
controlling an energy beam source to apply an energy beam in an active area of the layer of powder to selectively fuse a portion of the powder in the active area to form a portion of a build piece, wherein the active area includes a first active area arranged after the first depositor and a second active area arranged after the second depositor; and
varying a layer thickness of the selectively fused deposited powder, during a build of the build piece, includes controlling the energy beam source to fuse some portions of the powder layer in both the first active area and the second active area and to fuse other portions of the powder layer in only the first active area or the second active area.

29. The method of claim 28, wherein the first depositor is arranged 180 degrees apart from the second depositor with respect to the rotational motion.

30. The apparatus of claim 28, wherein controlling the energy beam source includes fusing a portion of the build piece near the edge of the build piece by fusing in both the first and second active areas, and fusing a portion of the build piece in the interior bulk of the build piece in only the first or second active area.

31. The apparatus of claim 28, wherein controlling the energy beam source further includes applying a plurality of energy beams simultaneously in the first active area and the second active area.

32. The method of claim 28, wherein controlling the motor system causes the rotational motion at least in part by rotating the build floor.

33. The method of claim 28, wherein the depositor system is configured to remain stationary during the rotational motion.

34. The method of claim 28, wherein controlling the motor system causes the rotational motion at least in part by moving the depositor system in an arc over the build floor.

35. The method of claim 28, wherein the receptacle wall is configured to remain stationary during the rotational motion.

36. The method of claim 28, further comprising:
controlling a gas flow system to provide a gas flow across the active area.

37. The method of claim 36, wherein the gas flow system extracts a gas created by the fusing of the powder.

38. The method of claim 28, further comprising:
covering a second area of the powder exclusive of the active area with a cover.

39. The method of claim 38, further comprising:
controlling a heater to heat the powder under the cover, wherein the heater is arranged in the cover.

40. The method of claim 38, further comprising:
controlling a sensor to sense a characteristic of the powder under the cover, wherein the sensor is arranged in the cover.

41. The method of claim 28, further comprising:
controlling a gas flow system including a gas extractor arranged adjacent to a first boundary of the active area, such that the gas extractor extracts a gas flow.

42. The method of claim 41, wherein the gas flow system further includes a gas inlet arranged adjacent to a second boundary of the active area, the gas inlet being configured to provide the gas flow.

43. The method of claim 28, further comprising:
controlling a gas flow system including a gas extractor arranged at an axis of rotation of the rotational motion, such that the gas extractor extracts a gas flow.

44. The method of claim 43, wherein the gas flow system further includes a gas inlet arranged at a portion of the receptacle wall, the gas inlet being configured to provide the gas flow.

45. The method of claim 44, wherein the gas inlet includes a plurality of openings that collectively surround the build floor.

46. The method of claim 28, wherein the energy beam source includes one or more energy beam generators, and controlling the energy beam source includes applying one or more energy beams in the first active area and the second active area to selectively fuse a portion of the powder in each of the active areas, and controlling a gas flow system to provide a gas flow across each of the active areas while the one or more energy beams selectively fuse the portion of the powder in each active area.

47. The method of claim 46, wherein the active areas are non-overlapping.

48. The method of claim 28, further comprising:
controlling a gas flow system including a funnel-type gas manifold to provide a gas flow across the active area.

49. The method of claim 28, further comprising:
controlling a gas flow system to rotate a direction of a gas flow across the active area.

50. The method of claim 49, wherein the gas flow system includes a plurality of gas inlets and a plurality of gas extractors, and controlling the gas flow system includes rotating the gas flow by opening and closing the gas inlets and the gas extractors.

51. The method of claim 28, further comprising:
varying a speed of the rotational motion based on a geometric feature density.

52. The method of claim 28, wherein the first depositor, the second depositor and a third depositor are each 120 degrees apart with respect to the rotational motion.

53. The method of claim 28, wherein the energy beam source comprising a plurality of energy beams,
wherein the first depositor depositing a first thickness of the powder and the second depositor depositing a second thickness of the powder,
wherein a first energy beam of the plurality of energy beams fusing the first thickness of the powder in the first active area, a second energy beam of the plurality of energy beams fusing the second thickness of the powder in the second active area, and the first energy beam of the plurality of energy beams fusing the first thickness of the powder and the second thickness of the powder in the first active area.

54. The method of claim 28, wherein the energy beam source selectively fusing the portions is configured to selectively fuse at least twice per a full rotation between the depositor system and the build floor.

55. An apparatus, comprising:
a build floor;
a depositor system configured to deposit a layer of powder onto the build floor;
a motor system configured to cause a rotational motion between the depositor system and the build floor, wherein the depositor system deposits the layer of powder during the rotational motion;
a receptacle wall configured to contain the powder on the build floor;
an energy beam source configured to apply an energy beam in an active area of the layer of powder to selectively fuse a portion of the powder in the active area to form a portion of a build piece; and
a cover configured to cover a second area of the powder exclusive of the active area.

56. The apparatus of claim 55, wherein the motor system is further configured to vary a speed of the rotational motion based on information of a build including the build piece.

57. The apparatus of claim 56, wherein the information of the build includes a geometric feature density, and the motor system is configured to vary the speed by increasing the speed when the geometric feature density is lower and increasing the speed when the geometric feature density is higher.

58. The apparatus of claim 56, wherein the information of the build includes a geometric feature density, and the speed of the rotational motion is varied based on the geometric feature density.

59. The apparatus of claim 55, wherein the motor system causes the rotational motion at least in part by rotating the build floor.

60. The apparatus of claim 59, wherein the depositor system is configured to remain stationary during the rotational motion.

61. The apparatus of claim 55, wherein the motor system causes the rotational motion at least in part by moving the depositor system in an arc over the build floor.

62. The apparatus of claim 55, wherein the receptacle wall is configured to remain stationary during the rotational motion.

63. The apparatus of claim 55, wherein a gas flow system extracts a gas created by the fusing of the powder.

64. The apparatus of claim 55, wherein the cover includes a heater configured to heat the powder under the cover.

65. The apparatus of claim 55, wherein the cover includes a sensor.

66. The apparatus of claim 65, wherein the sensor is configured to sense a characteristic of the powder under the cover.

67. The apparatus of claim 65, wherein the sensor is configured to sense a characteristic of the build piece.

68. The apparatus of claim 65, wherein the sensor is configured to sense a defect of the build piece.

69. The apparatus of claim 65, wherein the sensor includes an eddy current sensor.

70. The apparatus of claim 65, wherein the sensor includes a temperature sensor.

71. The apparatus of claim 65, wherein the sensor includes a camera.

72. The apparatus of claim 55, further comprising a gas flow system including a gas extractor arranged adjacent to a first boundary of the active area, the gas extractor being configured to extract the gas flow.

73. The apparatus of claim 72, wherein the gas flow system further includes a gas inlet arranged adjacent to a second boundary of the active area, the gas inlet being configured to provide the gas flow.

74. The apparatus of claim 55, further comprising a gas flow system including a gas extractor arranged at an axis of rotation of the rotational motion, the gas extractor being configured to extract the gas flow.

75. The apparatus of claim 74, wherein the gas flow system further includes a gas inlet arranged at a portion of the receptacle wall, the gas inlet being configured to provide the gas flow.

76. The apparatus of claim 75, wherein the gas inlet includes a plurality of openings that collectively surround the build floor.

77. The apparatus of claim 55, wherein the energy beam source includes one or more energy beam generators, the energy beam source is configured to apply one or more energy beams in a plurality of active areas of the layer of powder to selectively fuse a portion of the powder in each of the active areas, and a gas flow system is configured to provide a gas flow across each of the active areas while the one or more energy beams selectively fuse the portion of the powder in each active area.

78. The apparatus of claim 77, wherein the active areas are non-overlapping.

79. The apparatus of claim 55, wherein a gas flow system includes a funnel-type gas manifold.

80. The apparatus of claim 55, wherein a gas flow system is further configured to rotate a direction of the gas flow.

81. The apparatus of claim 80, wherein the gas flow system includes a plurality of gas inlets and a plurality of gas extractors, and the gas flow system rotates the gas flow by opening and closing the gas inlets and the gas extractors.

82. The apparatus of claim 55, wherein a layer thickness of the selectively fused deposited powder is varied during a build of the build piece.

83. The apparatus of claim 55, wherein the depositor system includes a plurality of depositors, and the depositor system is configured to deposit a plurality of layers of powder simultaneously.

84. A method, comprising:
obtaining information of a build piece,
controlling a depositor system to deposit a layer of powder onto a build floor;
controlling a motor system to cause a rotational motion between the depositor system and the build floor, wherein the depositor system deposits the layer of powder during the rotational motion, and a receptacle wall contains the powder on the build floor;
controlling an energy beam source to apply an energy beam in an active area of the layer of powder to selectively fuse a portion of the powder in the active area to form a portion of the build piece; and
covering a second area of the powder exclusive of the active area with a cover.

85. The method of claim 84, wherein controlling the motor system further includes varying a speed of the rotational motion based on the information of the build piece during a build of the build piece.

86. The method of claim 85, wherein the information of the build piece includes a geometric feature density, and controlling the motor system includes varying the speed based on the geometric feature density.

87. The method of claim 85, wherein the information of the build includes a geometric feature density, and varying the speed of the rotational motion includes increasing the speed when the geometric feature density is low and decreasing the speed when the geometric feature density is high.

88. The method of claim 84, wherein controlling the motor system causes the rotational motion at least in part by rotating the build floor.

89. The method of claim 88, wherein the depositor system is configured to remain stationary during the rotational motion.

90. The method of claim 84, wherein controlling the motor system causes the rotational motion at least in part by moving the depositor system in an arc over the build floor.

91. The method of claim 84, wherein the receptacle wall is configured to remain stationary during the rotational motion.

92. The method of claim 84, further comprising:
controlling a gas flow system to extract a gas created by the fusing of the powder.

93. The method of claim 84, further comprising:
controlling a heater to heat the powder under the cover, wherein the heater is arranged in the cover.

94. The method of claim 84, further comprising:
controlling a sensor to sense at least a characteristic of the powder under the cover or a characteristic of the build piece under the cover, wherein the sensor is arranged with the cover.

95. The method of claim 94, wherein controlling the sensor includes controlling the sensor to sense a defect of the build piece.

96. The method of claim 94, wherein controlling the sensor includes controlling the sensor to sense an eddy current.

97. The method of claim 94, wherein controlling the sensor includes controlling the sensor to sense a temperature.

98. The method of claim 94, wherein controlling the sensor includes controlling the sensor to sense an image from a camera.

99. The method of claim 84, further comprising:
controlling a gas flow system including a gas extractor arranged adjacent to a first boundary of the active area, the gas extractor being controlled to extract a gas flow.

100. The method of claim 99, wherein the gas flow system further includes a gas inlet arranged adjacent to a second boundary of the active area, controlling the gas flow system further includes controlling the gas inlet to provide the gas flow.

101. The method of claim 84, further comprising:
controlling a gas flow system including a gas extractor arranged at an axis of rotation of the rotational motion, wherein the gas extractor is controlled to extract a gas flow.

102. The method of claim 101, wherein the gas flow system further includes a gas inlet arranged at a portion of the receptacle wall, controlling the gas flow system further includes controlling the gas inlet to provide the gas flow.

103. The method of claim 102, wherein the gas inlet includes a plurality of openings that collectively surround the build floor.

104. The method of claim 84, wherein the energy beam source includes one or more energy beam generators, controlling the energy beam source includes applying one or more energy beams in a plurality of active areas of the layer of powder to selectively fuse a portion of the powder in each of the active areas, the method further comprising:
controlling a gas flow system to provide a gas flow across each of the active areas while the one or more energy beams selectively fuse the portion of the powder in each active area.

105. The method of claim 104, wherein the active areas are non-overlapping.

106. The method of claim 104, wherein the gas flow system includes a funnel-type gas manifold.

107. The method of claim 84, further comprising:
controlling a gas flow system to rotate a direction of the gas flow across the active area.

108. The method of claim 107, wherein controlling the gas flow system includes controlling a plurality of gas inlets and a plurality of gas extractors such that the gas flow system rotates the gas flow by opening and closing the gas inlets and the gas extractors.

109. The method of claim 84, further comprising:
varying a layer thickness of the selectively fused deposited powder during a build of the build piece.

110. The method of claim 84, wherein the depositor system includes a plurality of depositors, and controlling the depositor system includes depositing a plurality of layers of powder simultaneously.

111. An apparatus, comprising:
a build floor;
a depositor system configured to deposit a layer of powder onto the build floor;
a motor system configured to cause a rotational motion between the depositor system and the build floor, wherein the depositor system deposits the layer of powder during the rotational motion;
a receptacle wall configured to contain the powder on the build floor;
an energy beam source configured to apply an energy beam in an active area of the layer of powder to selectively fuse a portion of the powder in the active area to form a portion of a build piece; and
a gas flow system configured to provide a gas flow across a powder motion boundary of the active area while the energy beam selectively fuses the portion of the layer of powder in the active area.

112. The apparatus of claim 111, wherein the motor system causes the rotational motion at least in part by rotating the build floor.

113. The apparatus of claim 112, wherein the depositor system is configured to remain stationary during the rotational motion.

114. The apparatus of claim 111, wherein the motor system causes the rotational motion at least in part by moving the depositor system in an arc over the build floor.

115. The apparatus of claim 111, wherein the receptacle wall is configured to remain stationary during the rotational motion.

116. The apparatus of claim 111, wherein the gas flow system extracts a gas created by the fusing of the powder.

117. The apparatus of claim 111, further comprising:
a cover configured to cover a second area of the powder exclusive of the active area.

118. The apparatus of claim 117, wherein the cover includes a heater configured to heat the powder under the cover.

119. The apparatus of claim 117, wherein the cover includes a sensor configured to sense a characteristic of the powder under the cover.

120. The apparatus of claim 111, wherein the gas flow system includes a gas extractor arranged adjacent to the powder motion boundary of the active area, the gas extractor being configured to extract the gas flow.

121. The apparatus of claim 111, wherein the gas flow system includes a gas inlet arranged adjacent to the powder motion boundary of the active area, the gas inlet being configured to provide the gas flow.

122. The apparatus of claim 111, wherein the gas flow system includes a gas inlet, and the gas inlet includes a plurality of openings.

123. The apparatus of claim 111, wherein the energy beam source includes one or more energy beam generators, the energy beam source is configured to apply one or more energy beams in a plurality of active areas of the layer of powder to selectively fuse a portion of the powder in each of the active areas, and the gas flow system is configured to provide a gas flow across each of the active areas while the one or more energy beams selectively fuse the portion of the powder in each active area.

124. The apparatus of claim 123, wherein the active areas are non-overlapping.

125. The apparatus of claim 111, wherein the gas flow system includes a funnel-type gas manifold.

126. The apparatus of claim 111, wherein the gas flow system is further configured to rotate a direction of the gas flow.

127. The apparatus of claim 111, wherein a layer thickness of the selectively fused deposited powder is varied during a build of the build piece.

128. The apparatus of claim 111, wherein a speed of the rotational motion is varied based on a geometric feature density.

129. The apparatus of claim 111, wherein the depositor system includes a plurality of depositors, and the depositor system is configured to deposit a plurality of layers of powder simultaneously.

130. A method, comprising:
controlling a depositor system to deposit a layer of powder onto a build floor;
controlling a motor system to cause a rotational motion between the depositor system and the build floor, wherein the depositor system deposits the layer of powder during the rotational motion, and a receptacle wall contains the powder on the build floor;
controlling an energy beam source to apply an energy beam in an active area of the layer of powder to selectively fuse a portion of the powder in the active area to form a portion of a build piece;
controlling a gas flow system to provide a gas flow across a powder motion boundary of the active area while the energy beam selectively fuses the portion of the layer of powder in the active area.

131. The method of claim 130, wherein controlling the motor system causes the rotational motion at least in part by rotating the build floor.

132. The method of claim 130, wherein the depositor system is configured to remain stationary during the rotational motion.

133. The method of claim 130, wherein controlling the motor system causes the rotational motion at least in part by moving the depositor system in an arc over the build floor.

134. The method of claim 130, wherein the receptacle wall is configured to remain stationary during the rotational motion.

135. The method of claim 130, wherein controlling the gas flow system extracts a gas created by the fusing of the powder.

136. The method of claim 130, further comprising:
covering a second area of the powder exclusive of the active area with a cover.

137. The method of claim 136, further comprising:
controlling a heater configured to heat the powder under the cover, wherein the heater is arranged in the cover.

138. The method of claim 136, further comprising:
controlling a sensor to sense a characteristic of the powder under the cover, wherein the sensor is arranged in the cover.

139. The method of claim 130, wherein controlling the gas flow system includes controlling a gas extractor arranged adjacent to the powder motion boundary of the active area, the gas extractor being controlled to extract the gas flow.

140. The method of claim 130, wherein controlling the gas flow system further includes controlling a gas inlet arranged adjacent to the powder motion boundary of the active area, the gas inlet being controlled to provide the gas flow.

141. The method of claim 130, wherein the gas flow system includes a gas inlet, and the gas inlet includes a plurality of openings.

142. The method of claim 130, wherein the energy beam source includes one or more energy beam generators, controlling the energy beam source includes applying one or more energy beams in a plurality of active areas of the layer of powder to selectively fuse a portion of the powder in each of the active areas, and controlling the gas flow system includes providing a gas flow across each of the active areas while the one or more energy beams selectively fuse the portion of the powder in each active area.

143. The method of claim 142, wherein the active areas are non-overlapping.

144. The method of claim 130, wherein the gas flow system includes a funnel-type gas manifold.

145. The method of claim 130, wherein controlling the gas flow system includes rotating a direction of the gas flow.

146. The method of claim 130, further comprising:
varying a layer thickness of the selectively fused deposited powder during a build of the build piece.

147. The method of claim 130, further comprising:
obtaining information of a geometric feature density, wherein controlling the motor system includes varying a speed of the rotational motion based on the geometric feature density.

148. The method of claim 130, wherein the depositor system includes a plurality of depositors, and controlling the depositor system includes depositing a plurality of layers of powder simultaneously.

* * * * *